US007279121B2

(12) United States Patent
Hayashi

(10) Patent No.: US 7,279,121 B2
(45) Date of Patent: *Oct. 9, 2007

(54) PROCESS FOR PRODUCING ELECTROPHORETIC MICROCAPSULES

(75) Inventor: Masaki Hayashi, Okayama (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/007,233

(22) Filed: Dec. 9, 2004

(65) Prior Publication Data

US 2005/0129946 A1 Jun. 16, 2005

(30) Foreign Application Priority Data

Dec. 11, 2003 (JP) .............................. 2003-412684

(51) Int. Cl.
*B01J 13/02* (2006.01)
*B01J 13/20* (2006.01)
*B32B 5/16* (2006.01)

(52) U.S. Cl. ........................ 264/4.33; 264/4.1; 264/4.3; 428/402.2; 428/402.21

(58) Field of Classification Search ................ 428/402; 427/213.3; 264/4

See application file for complete search history.

(56) References Cited

U.S. PATENT DOCUMENTS

| 5,117,059 | A | * | 5/1992 | Tylor ........................... 564/252 |
| 5,227,421 | A | * | 7/1993 | Kageyama et al. ......... 524/449 |
| 5,438,083 | A | * | 8/1995 | Takimoto et al. ........... 523/401 |
| 6,120,588 | A | * | 9/2000 | Jacobson .................. 106/31.16 |

FOREIGN PATENT DOCUMENTS

| JP | 56-24040 A | 3/1981 |
| JP | 60-216838 A | 10/1985 |
| JP | 61-37975 B2 | 8/1986 |
| JP | 62-57645 A | 3/1987 |
| JP | 62-97638 A | 5/1987 |

(Continued)

OTHER PUBLICATIONS

Kondo Tamotsu et al., Microcapsules, pp. 46-51 (published by Sankyoshuppan Co., Ltd.) (new edition, 1987).

*Primary Examiner*—James J. Seidleck
*Assistant Examiner*—Saira B. Haider
(74) *Attorney, Agent, or Firm*—Birch, Stewart, Kolasch & Birch, LLP

(57) ABSTRACT

A microcapsule is produced by dispersing a liquid organic dispersion in an aqueous medium to form a capsule particle in the aqueous medium, the liquid organic dispersion containing an acid group-containing resin, a colored particle and an organic solvent, and the capsule particle comprising a disperse system containing the liquid organic dispersion, and a wall encapsulating the disperse system, wherein the acid group of the resin has been at least partly neutralized with an alkanolamine. The wall comprises the resin, and the resin may be crosslinked or cured with a crosslinking agent. Moreover, the process may comprise crosslinking or curing the resin constituting the wall with the crosslinking agent, and further crosslinking or curing the residual crosslinking agent with a polyfunctional compound. Such a process can produce a microcapsule has a small and uniform particle size while encapsulating a disperse system dispersed a colored particle in an oil phase.

11 Claims, 3 Drawing Sheets

FOREIGN PATENT DOCUMENTS

| | | |
|---|---|---|
| JP | 63-134048 A | 6/1988 |
| JP | 64-86116 A | 3/1989 |
| JP | 5-66600 A | 3/1993 |
| JP | 05-0666000 * | 3/1993 |
| JP | 5-27452 B2 | 4/1993 |
| JP | 5-51339 B2 | 8/1993 |
| JP | 5-53538 B2 | 8/1993 |
| JP | 5-53539 B2 | 8/1993 |
| JP | 6-362 A | 1/1994 |
| JP | 6-343852 A | 12/1994 |
| JP | 7-275689 A | 10/1995 |
| JP | 2551783 B2 | 8/1996 |
| JP | 9-290145 A | 11/1997 |
| JP | 2797960 B2 | 7/1998 |
| JP | 11-119264 A | 4/1999 |
| JP | 11-202372 A | 7/1999 |
| JP | 3035726 B2 | 2/2000 |
| JP | 2001-503873 A | 3/2001 |
| WO | WO98/19208 A2 | 5/1998 |

* cited by examiner

PROCESS FOR PRODUCING ELECTROPHORETIC MICROCAPSULES

FIELD OF THE INVENTION

The present invention relates to microcapsules (or particles encapsulating ink) useful for applying to electrophoretically image-displayable apparatuses (or devices), and to processes for producing the same.

BACKGROUND OF THE INVENTION

Microencapsulation techniques have been widely applied as one of means for enclosing (or sealing) various materials (or core materials) such as a dye, a perfume (aromatic or flavoring agent), a crystalline liquid, an enzyme, a catalyst, and an adhesive. The advantages of such techniques are in that the handleability of these core materials can be improved and that the functions of the core materials can be maintained or retained for a long period of time.

On the other hand, display techniques are utilized in a broad range from a displaying method for displaying an image or character information to a visualizing method using a mode such as a liquid crystal mode, a plasma emission mode, or an EL (electroluminescence) mode. In recent years, as various electronic apparatuses (or devices) are miniaturized due to rapid advance of semiconductor technology, there are increasing demands for the miniaturization, weight-saving, lower driving voltage, less electricity consumption to work, and thinner flat panel of display devices. As new display method for responding to these requirements, there are proposed electrophoretically image-displaying devices (or apparatuses) capable of writing images on the display surface by encapsulating microcapsules in a dispersed system (core material) in which electrophoretic particles (or electrophoretically-movable particles) are dispersed in a disperse medium, and interposing these microcapsules between electrode plates to migrate or move the electrophoretic particles in the microcapsules between these electrode plates by applying an electric field.

Japanese Patent Application Laid-Open No. 119264/1999 (JP-11-119264A) discloses a display device comprising a disperse system in which charged particles are dispersed into a disperse medium, a number of microcapsules encapsulating the disperse system, and a pair of opposed electrodes which are so disposed as to insert these microcapsules therebetween. In the display device, a given display operation is conducted by changing the distribution condition of the charged particles depending on an action of a controlled voltage to change the optical reflexivity. The particle size of the charged particles is about $1/1000$ to $1/5$ relative to that of the microcapsules, and the dispersivity in the particle size distribution of the charged particles (volume-average particle size/number-average particle size) is 1 to 2. Japanese Patent Application Laid-Open No. 202372/1999 (JP-11-202372A) discloses a display device comprising a disperse system comprising at least two kinds of charged particles encapsulated in the microcapsule, and a disperse medium containing a surfactant, wherein the charged particles contain at least one member of titanium oxide and carbon black.

Japanese Patent No. 2551783 discloses an electrophoretic display device using microcapsules encapsulating a disperse system, as microcapsules disposed between the electrodes, wherein the disperse system comprises a colored disperse medium, and at least one kind of an electrophoretic particle, dispersed in the medium, different in optical property from the medium. Further, Japanese Patent Application Laid-Open No. 503873/2001 (JP-2001-503873A) discloses an electrophoretically displaying device comprising an arrangement of discrete microscopic containers (or microcapsules); first and second electrodes disposed on and covering opposite sides of the arrangement, at least one of the electrodes being substantially visually transparent; a means for creating a potential difference between the two electrodes; and within each container, a suspension comprising a dielectric liquid and particles exhibiting surface charges in the dielectric liquid, wherein the dielectric liquid and the particles contracting visually, and the potential difference causing the particles to migrate toward one of the electrodes.

In such a microcapsule, the wall of the microcapsule should be dense or close to encapsulate a liquid as a core material. As a process for producing a microcapsule, physicochemical processes and chemical processes are known, and these processes have been suitably selected and utilized depending on applications of the microcapsule. As the physicochemical processes, a coacervation method using gelatin is well known, and is detailed in "Microcapsules (new edition, 1987)" attributed by Kondo Tamotsu et al. (published by Sankyoshuppan Co., Ltd.). Although this method is applied in a wide field, use of gelatin being a natural product causes variation of quality as a membrane material and deteriorates water resistance of the capsule, as a result the application is limited. Moreover, it is impossible to inhibit the formation of a core material-free coacervate particle/drop (as the core material, e.g., a coloring agent dispersed in oil), or the by-production of a capsule enclosing a plurality of core materials. Further, the coacervation method itself is a method for forming a capsule wall and fails to control the particle size of the resulting particles, and the particle size distribution of the particles depends on the dispersiveness of the core material. Therefore, according to the coacervation method, it is difficult to obtain a microcapsule encapsulating a disperse system in which a coloring agent is dispersed in an oil phase in high yield, while controlling the particle size and the particle size distribution.

As the chemical processes, in addition to an in-situ polymerization method (phase-separation method) which comprises allowing a reaction to proceed from a continuous aqueous phase for forming a wall made of an amino resin or others around a core material, there is known an interfacial polymerization in which a reaction component in an aqueous phase is reacted with another reaction component in an oil phase by polymerization or condensation at the phase interface for forming a polymeric wall of the microcapsule. In a production process of an encapsulated ink encapsulating a disperse system in which a coloring agent is dispersed in an oil phase, an in-situ polymerization method using an amino resin is particularly utilized. For example, Japanese Patent Publication No. 27452/1993 (JP-5-27452B) discloses a process for producing a microcapsule, which comprises polymerizing an initial condensate of a hydrophilic melamine-formaldehyde-series resin contained in a water or hydrophilic medium having an emulsifying agent, to coat a hydrophobic core material with the polymer product, wherein an acrylic copolymer is used as the emulsifying agent. Japanese Patent Publication No. 51339/1993 (JP-5-51339B) discloses a process for producing a microcapsule which comprises coating a hydrophobic material with a urea-formaldehyde resin coat in an acidic aqueous medium containing an anionic water-soluble polymer, wherein an acrylic copolymer is used as the anionic water-soluble material. Japanese Patent Publication No. 53538/1993 (JP-5-53538B) discloses a process for producing a microcapsule, which comprises dispersing or emulsifying a hydrophobic core material in an acidic aqueous solution containing an anionic water-soluble polymer material, and forming an amino-aldehyde resin coat as a wall on a surface of the hydrophobic core material in this system, wherein a polymer material containing an acrylamide-alkylsulfonic acid or a salt thereof as an essential monomer is used as the anionic water-soluble polymer material. Japanese Patent Publication No. 53539/1993 (JP-5-53539B) discloses a process for producing a microcapsule, which comprises emulsifying a hydrophobic and hardly volatile organic compound in an aqueous solution of an acrylic acid-methacrylic acid copolymer, and adding urea and/or melamine and formaldehyde to the resulting matter for polymerization, to form a coat of a copolymer such as a urea-formaldehyde copolymer or a melamine-formaldehyde copolymer around the organic compound. In such an in-situ polymerization method, however, since a large number of capsule particles without the coloring agent are produced as by-products in the encapsulation process, a step for removing not only an emulsifying and dispersing agent but also by-product particles is essential. Further, as the same as in the coacervation method, the particle size distribution depends on the dispersiveness of the core material.

Moreover, as the interfacial polymerization method, there is known a method for forming a wall of a capsule by polymerizing a polyhydric alcohol existing in a continuous aqueous phase and an isocyanate monomer existing in an oil phase of a core material at the interface surface. For example, Japanese Patent Application Laid-Open No. 000362/1994 (JP-6-000362A) discloses a process for producing a microcapsule, which comprises covering a hydrophobic liquid with a polyurea or a polyurethane resin by an interfacial polymerization, wherein the hydrophobic liquid in which a polybasic acid halide and a polyvalent isocyanate are dissolved is added and dispersed in an aqueous solution of a water-soluble polymer material having a hydroxyl group, an amino group or an imino group, and an alkaline compound is added thereto, and then a polyvalent amine or a polyhydric alcohol is added to the resulting mixture. Japanese Patent Application Laid-Open No. 343852/1994 (JP-6-343852A) discloses a process for producing a microcapsule whose wall comprises a polyurea or a polyurethane polyurea, wherein an oil-in-water droplet type emulsion is obtained from an aqueous solution and an oil-based solution by using a stirrer equipped with a saw-toothed impeller, and then the wall is formed. Japanese patent Publication No. 37975/1986 (JP-61-37975B) discloses a process for producing a microcapsule, which comprises emulsifying a hydrophobic liquid in which a polyvalent isocyanate is dissolved, into fine drops in an aqueous solution containing an emulsifying agent, and forming a coat on the interface, wherein the increase of the viscosity due to the preservation of the emulsified liquid is inhibited by adding a salt of a thio acid in the aqueous solution containing the emulsifying agent. Japanese Patent No. 2797960 discloses a process for producing a microcapsule, which comprises emulsifying a hydrophobic liquid in which a polyvalent isocyanate is dissolved, in an aqueous solution containing an emulsifying agent, and then forming a coat on the interface between the hydrophobic liquid and water, wherein the use of an acrylic multiple copolymer as a main component of the emulsifying agent can eliminate generation of formaldehyde and improves solvent resistance, heat resistance, pressure resistance, and others, of the microcapsule. Japanese Patent No. 3035726 discloses an oil-containing microcapsule in which a liquid lubricant is coated with a three-dimensional urethane polymer membrane. Such an interfacial polymerization has advantages that the formation of particles without a core material can be inhibited. However, in the interfacial polymerization, unreacted monomers remain in the oil phase and the aqueous phase, and electrophoretic properties of the colored fine particles is deteriorated due to highly polar isocyanate monomers remaining in the oil phase in use as an encapsulated ink for an electrophoretic display material. Further, as the same as in the encapsulation method by coacervation or in-situ polymerization, the particle size distribution depends on the dispersiveness of the core material.

Therefore, new microencapsulation techniques have been required for an electrophoretic particle microcapsulating ink, by which production of microcapsule particles without a coloring agent can be inhibited and the particle size can be controlled.

Incidentally, Japanese Patent Application Laid-Open No. 66600/1993 (JP-5-66600A) discloses, as a powdery toner for visualizing an electrostatic latent image, an encapsulated toner encapsulating a coloring agent within an anionic self-water dispersible resin. This document describes a copolymer, as an anionic self-dispersible resin, having 20 to 500 mg equivalent of an acid group (such as carboxyl group) per 100 g of a solid resin. Moreover, the document also discloses a process for production of the toner, which comprises dispersing a mixed composition containing the anionic self-water dispersible resin and a coloring agent, forming a capsulated particle in an aqueous medium by phase inversion emulsification (emulsification with phase inversion) of the mixed composition, and separating the produced capsule particle from the aqueous medium for dryness; and a process for producing a toner which comprises, after the phase inversion emulsification, hydrolyzing the neutralized acid group to form a free acid group. An organic solvent and water which are utilized for the phase inversion are removed from the formed encapsulated toner by drying, and the resultant toner is used for fixation on an object by heat-melting. Therefore, in the encapsulated toner, the coloring agent cannot be moved in the capsule. Moreover, crosslinking of the resin deteriorates the fixing property of the toner.

SUMMARY OF THE INVENTION

It is therefore an object of the present invention to provide a microcapsule having a small and uniform particle size in spite of encapsulating (or enclosing) a disperse system in which a colored particle is dispersed in an oil phase, and a process for producing the microcapsule.

Another object of the present invention is to provide a microcapsule whose wall thickness is large and which is excellent in stability and durability along with mechanical strength, and a process for producing the microcapsule.

It is still another object of the present invention to provide a microcapsule which is capable of displaying a sharp and uniform image independent on a disperse state (or dispersiveness) of a core material in the case where a colored particle is electrophoretically movable, and a process for producing the microcapsule.

It is a further object of the present invention to provide a process for certainly and effectively producing a microcapsule having a controlled particle size in a simple manner by inhibiting gelation and formation of a non-encapsulated particle without an emulsifying and dispersing agent.

The inventor of the present invention made intensive studies to achieve the above objects and finally found that utilization of an acid group-containing resin, whose acid group has been at least partly neutralized with an alkanolamine, in emulsification/dispersion (dispersion with emulsification) or phase inversion emulsification (emulsification with phase inversion), ensures to inhibit gelation of microcapsule, efficiently encapsulate a disperse system (or core material) in which a colored particle is dispersed in an oil phase, and obtain a uniform microcapsule (or encapsulated ink) having a small particle size even without using a dispersion stabilizer. Moreover, the inventor also found that crosslinking or curing of a resin constituting the wall of the capsule particle with a crosslinking agent, or further crosslinking or curing of the residual crosslinking agent with a polyfunctional compound ensures to increase the thickness of the microcapsule wall, and to improve mechanical strength of the microcapsule accordingly. The present invention was accomplished based on the above findings.

That is, the production process of the present invention comprises dispersing a liquid organic dispersion in an aqueous medium to form a capsule particle in the aqueous medium, the liquid organic dispersion containing an acid group-containing resin, a colored particle and an organic solvent, and the capsule particle comprising a disperse system containing the liquid organic dispersion, and a wall encapsulating the disperse system, wherein the acid group of the resin has been at least partly neutralized with an alkanolamine represented by the following formula (1):

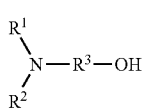

(1)

wherein $R^1$ and $R^2$ are the same or different and each represents a hydrogen atom or a hydrocarbon group which may have a hydroxyl group as a substituent; $R^1$ and $R^2$ may bond to each other to form a nitrogen-containing ring together with the adjacent nitrogen atom; and $R^3$ represents a linear or branched alkylene group. In the formula (1), $R^1$ and $R^2$ may be an alkyl group (e.g., a $C_{1-4}$alkyl group) which may have a hydroxyl group as a substituent, respectively, and $R^3$ may be a $C_{2-6}$ branched alkylene group (e.g., a $C_{2-4}$alkylene group which has a $C_{1-2}$alkyl group as a substituent). Moreover, $R^3$ may be a branched alkylene group represented by the following formula (1a):

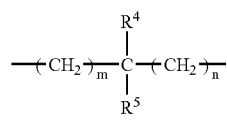

(1a)

wherein $R^4$ and $R^5$ are the same or different and each represents a hydrogen atom or a $C_{1-2}$alkyl group; at least one of $R^4$ and $R^5$ is a $C_{1-2}$alkyl group; "m" and "n" are the same or different and each denotes an integer of 0 to 3; and the total of "m" and "n" is integer of 1 to 3.

In the production process, the acid group of the resin may comprise at least one member selected from the group consisting of a carboxyl group, an acid anhydride group, a phosphoric acid group, a sulfonic acid group and a sulfuric acid group, and the resin may have an acid value of about 20 to 400 mgKOH/g in a free form. The acid group-containing resin maybe, for example, (i) a copolymer of an acidic polymerizable monomer, and a polymerizable monomer copolymerizable to the acidic polymerizable monomer, or (ii) a copolymer of the acidic polymerizable monomer, the polymerizable monomer copolymerizable to the acidic polymerizable monomer, and a monomer containing a crosslinkable functional group other than an acid group. Moreover, the wall may comprise the resin, and the resin may be crosslinked or cured, or the resin may be crosslinked or cured with a crosslinking agent. The resin constituting the wall may have a functional group participating in crosslinking or curing, and the combination of the functional group and the crosslinking agent may be, for example, (a) a combination of a carboxyl group and a carbodiimide group-containing compound, (b) a combination of a carboxyl group and a polyepoxy compound or an epoxy resin, (c) a combination of a carboxyl group and an oxazoline compound, or (d) a combination of a hydroxyl group and a polyisocyanate compound. Further, the process may comprise crosslinking or curing the resin constituting the wall with a crosslinking agent, and further crosslinking or curing the residual crosslinking agent with a polyfunctional compound such as a water-soluble polyfunctional compound having a low molecular weight (for example, crosslinking or curing by a reaction at the interface between an oil phase and a water phase). The combination of a crosslinkable group of the crosslinking agent and the polyfunctional compound may be, for example, (a) a combination of a carbodiimide group or an oxazoline group and a polycarboxylic acid or an anhydride thereof, (b) a combination of an epoxy group and at least one member selected from the group consisting of a polycarboxylic acid or an anhydride thereof and a polyamine compound, or (c) a combination of an isocyanate group and at least one member selected from the group consisting of a polyhydroxy compound and a polyamine compound.

The present invention also includes a microcapsule (or a microcapsule particle) comprising a disperse system containing a colored particle dispersed in an oil phase, and a wall encapsulating the disperse system, wherein the wall comprises an acid group-containing resin, and the acid group of the resin has been at least partly neutralized with an alkanolamine represented by the above-mentioned formula (1). In the microcapsule, the disperse system may comprise an electrically insulating dielectric liquid, and a single or a plurality of species of colored particle(s) dispersed in the dielectric liquid. Moreover, the colored particle may be charged in the oil phase and movable electrophoretically in the microcapsule by a potential difference. The colored particle may have a mean particle size of about 10 to 1000 nm (e.g., about 10 to 500 nm), and the microcapsule may have a mean particle size of about 1 to 1000 μm. The microcapsule may be interposed between a pair of electrodes, for displaying an image by electrophoresis of the colored particle.

Incidentally, in this specification the phrase "anionic resin" or "anionic water-dispersible resin" means a resin having an acid group or a salt thereof. The resin, in the free form, may be non-soluble (or insoluble) in water, and is soluble or dispersible in water (in other words, at least water dispersible) by neutralizing at least part of acid group with a base. That is, "anionic resin" and "anionic water-dispersible resin" can be subjected to neutralization of at least part of acid group with a base and can be contained (or dissolved) in an organic phase (or organic solvent phase), and the organic continuous phase containing the resin can be converted into a continuous phase of an aqueous medium (or water-continuous phase). Moreover, the term "acid group"

and the term "acidic group" may be used synonymously. Further, the phrase "colored particle" may use as the same meaning as the phrase "coloring agent". Furthermore, the phrase "(meth)acrylic monomer" is sometimes used as a general name for an acrylic monomer and a methacrylic monomer.

DETAILED DESCRIPTION OF THE INVENTION

[Microcapsule]

Figure 1:
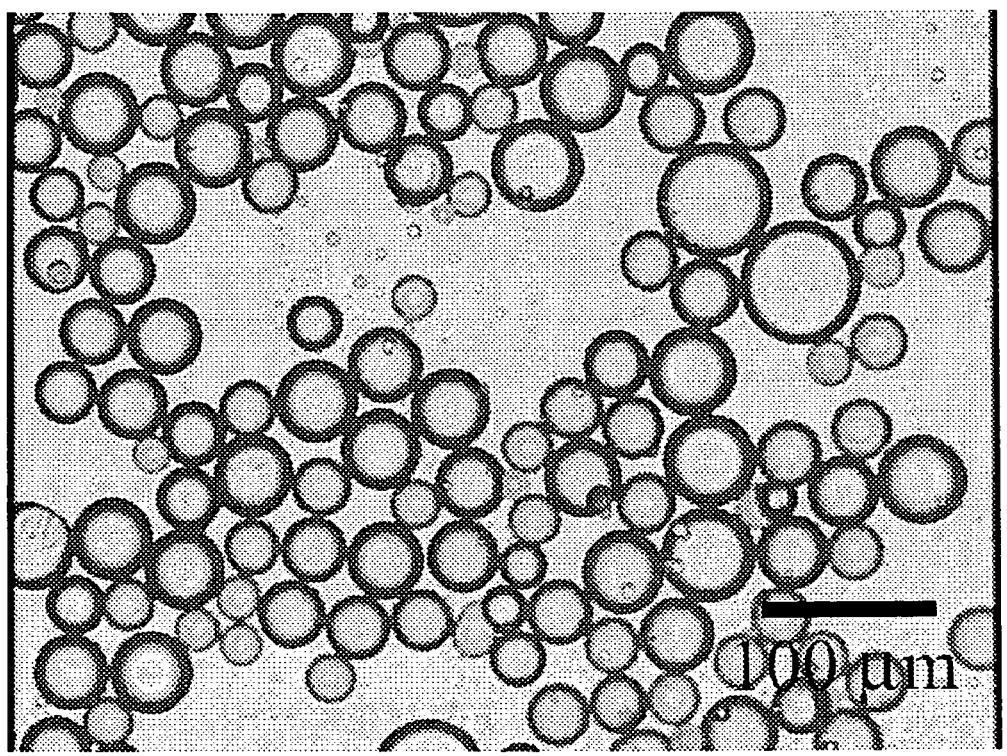
FIG. 1 is an optical microphotograph of the liquid capsule dispersion (without both titanium oxide and a pigment-dispersing agent) obtained in Example 1.

The microcapsule of the present invention comprises a disperse system (or oil phase-disperse system) in which a colored particle is dispersed in an oil phase, and a wall (or shell) which encapsulates (or encloses) the disperse system and is formed from a resin (anionic resin) having at least a neutralized acid group. The acid group of the resin forming the wall is neutralized with an alkanolamine. Neutralization of the acid group of the resin with an alkanolamine can efficiently stabilize the disperse system, and the particle size of thus obtained microcapsule can also be reduced, and a microcapsule having a narrow particle size distribution range and a uniform particle size can be obtained.

In the microcapsule of the present invention, the wall (or the resin constituting the wall) may be crosslinked or cured. Moreover, the wall may be crosslinked or cured with a crosslinking agent, or the wall may be crosslinked or cured with a crosslinking agent and then the residual crosslinking agent may be crosslinked or cured with a polyfunctional compound. Thus crosslinking or curing of the resin constituting the wall ensures to increase the thickness of the wall and also to improve mechanical strength of the microcapsule. Moreover, the acid group of the anionic rein may be utilized for the crosslinking or curing reaction. The microcapsule of the present invention also includes such a microcapsule whose wall has been crosslinked or cured.

(Anionic Resin)

The anionic resin (or self-water dispersible resin) constituting the microcapsule wall has an acid group to impart hydrophilicity to the resin. When the acid group is neutralized with a base (alkanolamine), an anion is formed in a water medium thereby exhibiting hydrophilicity. The typical acid group may include, for example, a carboxyl group, an acid anhydride group, a phosphoric acid group, a sulfonic acid group, a sulfuric acid group, and others. The anionic resin may have these acid groups singly or in combination. The acid group is usually a carboxyl group or an acid anhydride group, or a sulfonic acid group in practical usage.

The species of the anionic resin is not particularly limited to a specific one as far as an organic phase containing the anionic resin whose acid group has been at least partly neutralized can form a discontinuous phase (or organic droplet phase) by dispersing in an aqueous continuous phase through mixing with an aqueous medium (such as water). The dispersion of the organic phase in the aqueous medium may be carried out by emulsification/dispersion (dispersion with emulsification), or carried out by phase inversion (or phase inversion emulsification) through mixing the organic continuous phase with the aqueous medium. Such a resin may be a condensation-series resin containing the acid group (e.g., a carboxyl group and/or a sulfonic acid group) at a given concentration [for example, a polyester-series resin (e.g., an aliphatic polyester-series resin, an aromatic polyester-series resin, a polyester-series elastomer), a polyamide-series resin, a polyurethane-series resin], or may be a polymerization-series resin [for example, an olefinic resin, a styrenic resin, a (meth)acrylic resin].

The typical resin having an acid group (or acid group-containing resin) may be obtained by polymerization of a polymerizable monomer having at least an acid group (or acidic polymerizable monomer), and may be usually obtained by copolymerization of an acidic polymerizable monomer and a polymerizable monomer (or acid group-free polymerizable monomer) which is copolymerizable to the acidic polymerizable monomer. If necessary, a monomer containing a crosslinkable functional group other than an acid group may be further copolymerized.

The typical examples of the acid group-containing polymerizable monomer include a polymerizable carboxylic acid [e.g., a polymerizable monocarboxylic acid such as (meth)acrylic acid, or crotonic acid; a partial ester of a polymerizable polycarboxylic acid, such as a mono$C_{1-10}$alkyl ester of itaconic acid (e.g., monobutyl itaconate), or a mono$C_{1-10}$alkyl ester of maleic acid (e.g., monobutyl maleate); a polymerizable polycarboxylic acid such as itaconic acid, maleic acid or fumaric acid; an acid anhydride corresponding to the polymerizable polycarboxylic acid, such as maleic anhydride], a phosphoric acid group-containing monomer or an acid phosphoxyalkyl(meth)acrylate [for example, a phosphoxy$C_{2-6}$alkyl(meth)acrylate such as 2-phosphoxyethyl (meth)acrylate, or 4-phosphoxybutyl(meth)acrylate; an acid phosphoxy$C_{2-6}$alkyl(meth)acrylate such as phosphoxy acid phosphoxyethyl(meth)acrylate, or acid phosphoxypropyl (meth)acrylate], a sulfonic acid group-containing polymerizable monomer [for example, 3-chloro-2-acrylamide-2-methylpropanesulfonic acid, and styrenesulfonic acid], a sulfoalkyl(meth)acrylate [for example, a sulfo$C_{2-6}$alkyl (meth)acrylate such as 2-sulfoethyl(meth)acrylate], and others. These acid group-containing polymerizable monomers may be used singly or in combination. The preferred polymerizable monomer includes a polymerizable monomer having a carboxyl group, an acid anhydride group, or a sulfonic acid group. As the acid group-containing polymerizable monomer, (meth)acrylic acid is practically used.

The amount of the acid group-containing polymerizable monomer may be selected from such a range that a droplet can be formed by dispersing a resin-containing organic phase in an aqueous continuous phase by emulsification/dispersion or phase inversion emulsification, for example, a range that a given acid value described below can be imparted to the resin. The amount of the acid group-containing polymerizable monomer may be usually about 3 to 80 mol %, preferably about 10 to 60 mol % (e.g., 15 to 50 mol %), and more preferably about 20 to 40 mol % (e.g., 25 to 35 mol %) relative to the total monomers.

The copolymerizable monomer includes, for example, a styrenic monomer (or aromatic vinyl monomer) [e.g., styrene, an alkylstyrene (e.g., vinyltoluene, vinylxylene, 2-methylstyrene and t-butylstyrene), and a halostyrene (e.g., chlorostyrene)], an alkyl ester of (meth)acrylic acid [e.g., a linear or branched $C_{1-18}$alkyl(meth)acrylate, such as methyl (meth)acrylate, ethyl(meth)acrylate, isopropyl(meth)acrylate, n-butyl(meth)acrylate, isobutyl(meth)acrylate, t-butyl (meth)acrylate, n-hexyl(meth)acrylate, n-octyl(meth) acrylate, n-amyl(meth)acrylate, isoamyl(meth)acrylate, n-hexyl(meth)acrylate, 2-ethylhexyl(meth)acrylate, n-octyl (meth)acrylate, decyl(meth)acrylate, or dodecyl(meth)acrylate], a vinyl ester or a vinyl ester of an organic acid [e.g., a vinyl ester of a linear or branched $C_{2-20}$alipatic carboxylic acid, such as vinyl acetate, vinyl propionate, or vinyl versatate; a vinyl ester of an aromatic carboxylic acid, such as vinyl benzoate], a polymerizable nitrile or a vinylcyanide [e.g., (meth)acrylonitrile], an olefin [e.g., $\alpha$-$C_{2-10}$olefin such as ethylene, propylene, or butene], a halogen-containing monomer [e.g., a chlorine-containing monomer (such as vinyl chloride or vinylidene chloride), a fluorine-containing vinyl monomer (such as vinyl fluoride, vinylidene fluoride, tetrafluoroethylene, hexafluoropropylene, chlorotrifluoroethylene, or a (meth)acrylate having a fluorine-containing alkyl group)], a monomer having ultraviolet absorbability or antioxidant property [e.g., a polymerizable monomer having a benzotriazole ring, such as 2-(2'-hydroxy-5-(meth)acryloyloxyethylphenyl)-2H-benzotriazole; a polymerizable monomer having a benzophenone backbone, such as 2-hydroxy-4-(2-(meth)acryloyloxyethoxy)benzophenone; a polymerizable monomer having 2,2,6,6-tetramethylpiperidyl group, such as 1,2,2,6,6-pentamethyl-4-piperidyl (meth)acrylate], a nitrogen-containing monomer [e.g., N-vinylpyrrolidone, and diacetone acrylamide], a macromonomer having one polymerizable unsaturated group in one terminal (or end) of the molecular, and others. These copolymerizable monomers may be used singly or in combination.

Among these copolymerizable monomer, a styrenic monomer (particularly styrene), and an alkyl ester of (meth) acrylic acid [in particular a $C_{1-12}$alkyl acrylate, a $C_{1-4}$alkyl methacrylate (e.g., methyl methacrylate)] are usually employed. Thus obtained copolymer may be a styrene-(meth)acrylate-(meth)acrylic acid-series copolymer.

The preferred anionic resin usually has a functional group participating in crosslinking or curing ((A1) a self-crosslinkable group, or (A2) a crosslinkable functional group to (i) a reactive group of a resin or (ii) a crosslinking agent). Such an anionic resin may be obtained by copolymerization of a polymerizable monomer having a functional group (crosslinkable functional group) with the polymerizable monomer having the acid group and/or the copolymerizable monomer. Moreover, the acid group of the anionic resin may be utilized as a crosslinkable functional group, and such an anionic resin may be obtained by polymerization of the polymerizable monomer having the acid group, and optionally the copolymerizable monomer.

Among the polymerizable monomers (copolymerizable monomers) having the crosslinkable functional group, as the polymerizable monomer having (A1) the self-crosslinkable group, there may be mentioned a polymerizable monomer having a methylol group or an N-alkoxymethyl group [e.g., N-methylol(meth)acrylamide, and an N-alkoxymethyl (meth)acrylamide such as N-butoxymethyl(meth)acrylamide], a polymerizable monomer having a silyl group or an alkoxysilyl group [e.g., a $C_{1-2}$alkoxyvinylsilane such as dimethoxymethylvinylsilane, or trimethoxyvinylsilane; a (meth)acryloyloxyalkyl$C_{1-2}$alkoxysilane such as 2-(meth) acryloyloxyethyldimethoxymethylsilane, 2-(meth)acryloyloxypropyldimethoxymethylsilane, 2-(meth)acryloyloxyethyltrimethoxysilane, or 2-(meth) acryloyloxypropyltrimethoxysilane], and others.

Moreover, it is sufficient that (A2) the crosslinkable functional group to (i) the reactive group of the resin and/or (ii) the crosslinking agent can form a crosslinking system relative to (i) the reactive group of the resin and/or (ii) the crosslinking agent. The crosslinkable functional group (A2) includes, for example, a reactive group with respect to a carboxyl group or acid anhydride group (e.g., an epoxy group or glycidyl group, a hydroxyl group, a methylol group, and an N-alkoxymethyl group) and a reactive group with respect to a hydroxyl group (e.g., a carboxyl group or acid anhydride group, an isocyanate group, a methylol group, an N-alkoxymethyl group, and a silyl group or alkoxysilyl group), depending on the species of (i) the reactive group of the resin and/or (ii) the crosslinking agent. Among these crosslinkable functional groups (A2), a carboxyl group or acid anhydride group, a hydroxyl group, a glycidyl group, or the like is commonly used in many cases.

Among monomers having such a crosslinkable functional group (A2) relative to (i) the reactive group of the resin and/or (ii) the crosslinking agent, a polymerizable monomer having a carboxyl group or an acid anhydride group, and a polymerizable monomer having a methylol group, an N-alkoxymethyl group, a silyl group or an alkoxysilyl group are the same as mentioned above. As the polymerizable monomer containing an epoxy group or a glycidyl group, there may be exemplified glycidyl(meth)acrylate, allylglycidyl ether, and others. The polymerizable monomer containing a hydroxyl group includes an alkylene glycol mono (meth)acrylate [e.g., 2-hydroxyethyl(meth)acrylate, 2-hydroxypropyl(meth)acrylate, 4-hydroxybutyl(meth)acrylate, hexanediol mono(meth)acrylate], a hydroxyl group-containing (meth)acrylate [e.g., a (poly)oxyalkylene glycol mono(meth)acrylate such as diethylene glycol mono(meth) acrylate, polyethylene glycol mono(meth)acrylate, or polypropylene glycol mono(meth)acrylate], a (meth)acrylic monomer added thereto a lactone [e.g., "PLACCEL FM-2" and "PLACCEL FA-2", each manufactured by Daicel Chemical Industries, Ltd.], a hydroxyalkyl vinyl ether such as hydroxyethyl vinyl ether, or hydroxybutyl vinyl ether, and others. The polymerizable monomer having an isocyanate group includes, for example, vinylphenylisocyanate.

The amount of the polymerizable monomer having (A1) the self-crosslinkable group or (A2) the crosslinkable functional group may be selected depending on the resin property, and may for example be about 1 to 50 mol % (e.g., 3 to 30 mol %), preferably about 4 to 25 mol %, and more preferably about 5 to 20 mol % relative to the total monomers.

The polymerization of the polymerizable monomer may be conducted by a conventional method, for example, a thermal polymerization, a solution polymerization, or a suspension polymerization, and is usually carried out by a solution polymerization which comprises polymerizing a monomer in a reaction solvent (organic solvent) in practical cases. The reaction solvent includes an inactive solvent, for example, an aromatic hydrocarbon such as toluene, xylene, or benzene; an alicyclic hydrocarbon such as cyclohexane; an aliphatic hydrocarbon such as hexane; an alcohol such as methanol, ethanol, (iso)propanol, or butanol; a ketone such as acetone, methyl ethyl ketone, or methyl isobutyl ketone; an ester such as ethyl acetate, or butyl acetate; an ether alcohol such as cellosolve, or carbitol; an ether ester such as butyl cellosolve acetate; and others. These solvents may be used singly or in combination as a mixed solvent. In the preferred embodiment, a readily removable solvent, e.g., a solvent having a low boiling point (for example, a solvent having a boiling point of about 70 to 120° C.) such as isopropanol, acetone, methyl ethyl ketone, or ethyl acetate may be used.

The polymerization of the polymerizable monomer may be conducted in the presence of a polymerization initiator. As the polymerization initiator, there may be exemplified a peroxide (e.g., a diacyl peroxide such as benzoyl peroxide or lauroyl peroxide, a dialkyl peroxide such as di-t-butyl peroxide or dicumyl peroxide, an alkyl hydroperoxide such as t-butyl hydroperoxide or cumene hydroperoxide, methyl ethyl ketone peroxide, and t-butyl peroxy-2-ethylhexanoate), an azo-series compound (e.g., azobisisobutyronitrile, and azobisisovaleronitrile), a persulfate salt, hydrogen peroxide, and others. The polymerization may be usually carried out at a temperature of about 50 to 150° C. under an inert atmosphere.

The molecular weight of the anionic resin may be selected from a range which does not deteriorate mechanical properties of the resin as a capsule wall. The number average molecular weight of the resin may be usually selected from the range of about $0.3 \times 10^4$ to $10 \times 10^4$, and preferably about $0.5 \times 10^4$ to $7 \times 10^4$ (e.g., about $1 \times 10^4$ to $5 \times 10^4$). Too small molecular weight of the resin tends to deteriorate the properties (e.g., mechanical property) of a capsule wall. Too large molecular weight thereof has a possibility to deteriorate dispersibility (e.g., property for phase inversion emulsification) due to increase of the viscosity, or to decrease controllability of the particle size and sharpness of the particle diameter distribution (or particle size distribution).

Incidentally, the molecular weight of the water-dispersible resin may be adjusted by the species and amount of the polymerization initiator, the polymerization temperature, the species and amount of the organic solvent to be used, and other factors. Moreover, the molecular weight may be also controlled by using a polyfunctional radical-polymerizable monomer (e.g., divinylbenzene, and ethylene glycol di(meth)acrylate), a polyfunctional polymerization initiator (such as a polymerization initiator having a plurality of peroxy groups or a plurality of azo groups), a chain transfer agent, or others.

From the viewpoint of preventing the microcapsule from adhesion or from blocking under a high temperature along with drying of the capsule particle, as well as the properties as a material for the electrophoretic display device, it is preferred that the anionic resin has high transparency and is in a solid form at an ambient temperature at which the microcapsule is used, for example, at a temperature of not higher than 50° C. (e.g., a room temperature such as about 10 to 30° C.).

The concentration of the acid group of the water-dispersible resin may be selected from a range that a stable capsule particle can be formed by neutralizing at least part (part or all) of the acid group (or formed by at least partly neutralizing the acid group) with a base and dispersing (emulsification/dispersion or phase inversion emulsification). When the acid group is in a free form, the acid value of the resin is, for example, about 20 to 400 mgKOH/g, preferably about 50 to 300 mgKOH/g (e.g., about 50 to 250 mgKOH/g), and more preferably about 100 to 200 mgKOH/g. The acid value means an amount (mg) of KOH necessary to neutralize 1 g of the resin (solid contents). If the acid value is too small, there is a possibility that it may be difficult to improve dispersibility of the dispersed system (dispersibility by emulsification/dispersion or phase inversion emulsification) and to form a capsule particle even when not less than 100 mol % of the acid group is neutralized with a base. On the other hand, too large acid value has a possibility to unstabilize the formation of particles in an aqueous medium.

Moreover, in order to inhibit volatilization or exudation (or leakage) of the oil phase (organic phase or organic solvent phase) of the encapsulated core material, the anionic resin preferably has a barrier property against the oil phase of the core material (for example, a resin being insoluble against the oil phase or non-erodible by the oil phase).

The glass transition temperature (Tg) of the anionic resin may for example be selected from the range of about −25° C. to 150° C. and preferably about 0 to 120° C. (e.g., about 25 to 120° C.), depending on the ambient temperature of the microcapsule. The glass transition temperature of the anionic resin may be also about 50 to 120° C. (e.g., about 70 to 100° C.).

In the present invention, the disperse system (core material) encapsulated in the microcapsule comprises an oil phase (organic solvent phase or disperse medium), and a colored particle dispersed in the oil phase. The colored particle in the oil phase is usually charged with electricity, and can be migrated or moved electrophoretically in the microcapsule by a potential difference. The oil phase is a liquid form at an ambient temperature at which the microcapsule is used (e.g., a room temperature such as about 10 to 30° C.), and the oil phase may usually comprise a hydrophobic liquid (hydrophobic organic solvent), in particular an electrically insulating dielectric liquid (e.g., a solvent having a volume resistivity of not less than $10^{10} \Omega$ and a dielectric constant of not less than 2.5).

As the disperse medium (or organic solvent phase) of the core material, there may be exemplified an electric insulative solvent having high electric resistance, for example, a hydrocarbon [e.g., an aromatic hydrocarbon such as benzene-series, toluene-series, or naphthene-series hydrocarbon; an alicyclic hydrocarbon such as cyclohexane; an aliphatic hydrocarbon such as hexane, kerosene, a linear or branched paraffinic hydrocarbon, or "ISOPAR" (trade name, manufactured by Exxon Mobil Corporation); and an alkyl-naphthalene], a diphenyl-diphenyl ether mixture, a halogen-containing solvent [for example, a halogenated hydrocarbon (e.g., hydrocarbon tetrachloride), a fluorine-containing solvent (e.g., a chlorofluorocarbon such as CHFC-123 or HCFC-141b; a fluoroalcohol; a fluorine-containing ether such as a fluoroether; a fluorine-containing ester such as a fluoroester; and a fluoroketone)], and a silicone oil [e.g., a poly(dialkylsiloxane) such as a poly(dimethylsiloxane)]. These solvents may be used singly or in combination.

The organic disperse medium of the core material has a higher boiling point than that of an organic solvent (for example, a reaction solvent to be used for polymerization of a polymerizable monomer) of a resin solution (or a liquid resin composition) to be subjected to dispersion (emulsification/dispersion, phase inversion emulsification) and is advantageously selected from a high-boiling organic solvent which can remain as the disperse medium for the coloring agent in the capsules even after removing the solvent from the resin solution.

As the colored particle of the disperse system (a coloring agent or a movable colored particle), various colored particles (achromatic or chromatic particles) may be utilized, and may be, for example, a particle different in optical properties from the disperse medium, a particle causing visual contrast by electrophoresis, a particle formable a visually recognizable pattern in the visible region directly or indirectly, and other colored particles. For example, there may be mentioned a colored particle such as an inorganic pigment (e.g., a black pigment such as carbon black, a white pigment such as titanium dioxide, zinc oxide or zinc sulfide, a red pigment such as iron oxide, a yellow pigment such as yellow iron oxide (FeO(OH)) or cadmium yellow, and a blue pigment such as Berlin blue (or iron blue) or ultramarine blue), an organic pigment (e.g., a yellow pigment such as pigment yellow or Diarylide yellow, an orangish pigment such as pigment orange, a red pigment such as pigment red, lake red or pigment violet, a blue pigment such as copper phthalocyanine blue or pigment blue, and a green pigment such as copper phthalocyanine green), a resin particle colored with a coloring agent (e.g., a dye, and a pigment). These colored particles may be used singly or in combination. That is, single (or the same kind (or class) or the same category or series) colored particles may be dispersed in the disperse medium (e.g., an electrically insulating dielectric liquid), or a plurality species of colored particles (or colored particles having different colors) may be dispersed in the disperse medium.

The mean particle size or particle diameter of the colored particle (coloring agent) may be selected from the range of about 0.01 to 1 μm, and may be on the nanometer length scale [e.g., about 10 to 1000 nm, preferably about 10 to 500 nm, (e.g., about 20 to 300 nm), and more preferably about 20 to 200 nm (e.g., about 20 to 150 nm)]. The colored particle (coloring agent) may have a particle size in a nanometer order (e.g., about 20 to 100 nm) which is transparent to visible light. The particle size distribution of the colored particle (coloring agent) is not particularly limited to a specific one, and a colored particle having narrow particle size distribution (e.g., monodisperse particle) is preferred.

The content of the colored particle in the core material may be in such a range that electrophoretical movability is not adversely affected, and the content may for example be about 1 to 20% by weight, preferably about 1 to 15% by weight, and more preferably about 1 to 10% by weight (e.g., about 1 to 5% by weight).

Incidentally, the disperse medium may be colored with various dyes (e.g., an oil soluble dye such as an anthraquinone or an azo compound) as far as the disperse medium produces the contrast in relation to the colored particle. For example, the disperse medium may be colored with a different color from the colored particle.

In order to inhibit aggregation of the colored particle (or movable particle) and improve dispersion stability, the disperse system may comprise a viscosity controller, as well as various components for controlling the polarity or surface charge amount of the colored particle, for example, a surface-treating agent (e.g., a resin having a polar group) for coating or covering on the surface of the colored particle or adhering or bonding to the surface thereof, a dispersing agent (e.g., a dispersion stabilizer, and a surfactant), a charge-controlling agent, and others.

In the present invention, since an acid group of an anionic resin is neutralized with an alkanolamine, an emulsion particle can be stabilized effectively in an aqueous medium and a microcapsule having a uniform and small particle size and a narrow molecular weight distribution can be obtained. The microcapsule is usually in a spherical form (including a fine spherical form). The mean particle size of the microcapsule may be selected from a wide range, for example, from about 1 to 1000 μm. The mean particle size of the microcapsule may be usually about 1 to 200 μm, preferably about 1 to 100 μm, and more preferably about 1 to 60 μm (e.g., about 1 to 50 μm), and may further be about 5 to 50 μm. Moreover, the particle size distribution of the microcapsule is not particularly limited to a specific one, usually exhibits a normal distribution, and the breadth of the distribution is preferably narrow (for example, monodisperse form). Incidentally, the microcapsule usually has a high light-transmittance, and may for example have a visible light transmittance of not less than 80%.

Moreover, in the case where the wall is crosslinked or cured with a crosslinking agent, a polyfunctional compound, or the like, the wall thickness of the capsule particle can be increased. The wall thickness of the capsule particle may be, for example, about 1 to 2000 nm, preferably about 50 to 1000 nm, and more preferably about 100 to 500 nm.

Such a microcapsule is useful for displaying an image (such as a character or a pattern) by interposing the microcapsule between a pair of electrodes constituting a display device (e.g., a pair of electrodes in which at least the electrode of the display side comprises a transparent electrode), and electrophoretically moving the colored particle in the microcapsule by applying a voltage to the electrodes (electromotive force). In the image display, the pair of electrodes may be changed or alternated in polarity in order to control a moving direction of the colored particle.

For example, in the case using a microcapsule encapsulating a disperse system (core material) which comprises a colored disperse medium and a dispersed colored particle producing a contrast with respect to the disperse medium (e.g., a particle different in optical properties from the disperse medium, or a colored particle different in color from the disperse medium), the disperse system shows or exhibits the color of the disperse medium in a normal condition (or state), and displays a pattern caused by the colored particle by electrophoretically moving the colored particle toward the display surface side in response of an action of an electric field. For instance, use of a disperse system comprising a disperse medium colored with a black dye and a white particle dispersed therein can display or exhibit a white pattern by electrophoretic movement of the white particle. Moreover, in a disperse system comprising a disperse medium colored with a yellow dye and a blue particle dispersed in the colored medium, a blue pattern can be displayed by electrophoretic movement of the blue particle.

Moreover, use of a microcapsule encapsulating (or including) a disperse system (core material) in which a single colored particle (e.g., a white particle, a black particle) is dispersed in a disperse medium ensures to display an image pattern on a display surface by electrophoresis of the colored particle. Moreover, a color pattern can be displayed or exhibited by optionally using a color filter in combination with the colored particle.

Further, a microcapsule encapsulating a disperse system (core material) in which a yellow particle (particularly, a particle of nanometer order) is dispersed in a medium (a yellow microcapsule), a microcapsule encapsulating a disperse system (core material) in which a red particle (particularly, a particle of nanometer order) is dispersed in a medium (a red microcapsule), a microcapsule encapsulating a disperse system (core material) in which a blue particle (particularly, a particle of nanometer order) is dispersed in a medium (a blue microcapsule), and optionally a microcapsule encapsulating a disperse system in which a black particle (particularly, a particle of nanometer order) is dispersed in a medium (a black microcapsule) are prepared.

Each of the colored microcapsules is interposed between a pair of electrodes, in the form of a layer structure, and a full-color pattern can be displayed or exhibited in response to controlling the voltage applied to each electrode or the polarity of the electrodes, by utilizing a subtractive mixture. Incidentally, if necessary, a color filter may be interposed between each layers.

Furthermore, an action of an electric field to each pixel which comprises a yellow pixel comprising a yellow microcapsule, a red pixel comprising a red microcapsule, and a blue pixel comprising a blue microcapsule ensures display of a full-color image. Incidentally, if necessary, a black pixel comprising a black microcapsule or a white pixel comprising a white microcapsule may be disposed between the electrodes.

Moreover, when a plurality of colored particles (or disperse system) which are charged with different electric charge (+ or −) from each other in the disperse medium are utilized, the movement of the plurality of colored particles in the reverse direction from each other can be realized by applying a voltage between opposed (faced) electrodes, and the moving direction of the plurality of colored particles can be controlled by switching (or controlling) the polarity of the applied voltage. For example, in the case using a microcapsule in which negatively charged titanium oxide and positively charged carbon black are dispersed in the disperse medium, a bright-colored image (faded color pattern) can be formed with titanium oxide by making the polarity of the electrodes of the display surface side positive, and also, a black image can be formed with carbon black by making the polarity of the electrodes of the display surface side negative.

[Process for Producing Microcapsule]

The microcapsule may be produced by dispersing a mixture (a liquid organic dispersion) in the aqueous medium to form a capsule particle in the aqueous medium, wherein the mixture contains an acid group-containing resin, a colored particle and an organic solvent, and the capsule particle comprises a disperse system (or core material) containing the liquid organic dispersion, and a wall encapsulating the disperse system, and the acid group of the resin has been at least partly neutralized with an alkanolamine. The formed capsule particle may be separated from the aqueous medium, and further, if necessary, may be dried.

Moreover, after production of the capsule particle, the resin constituting the wall maybe crosslinked or cured. The crosslinking or curing of the wall may be conducted in a suitable stage, for example, a step for drying the capsule particle, or conducted in the aqueous medium after production of the capsule particle.

(Preparation of Liquid Organic Dispersion)

In a preparation of the liquid organic dispersion constituting the disperse system, the order of mixing or dispersing the anionic resin, the colored particle and the organic solvent is not particularly limited to a specific one, and for example, (1) the colored particle may be mixed and dispersed in the organic solvent solution of the anionic resin, (2) the anionic resin, the colored particle and the organic solvent may be mixed to prepare a liquid dispersion, and (3) a liquid dispersion (or a coloring agent dispersed in oil phase) in which the colored particle is dispersed in the organic solvent, and the anionic resin or an organic solvent solution thereof may be mixed.

Incidentally, in such a method, the acid group of the anionic resin may be subjected to neutralization treatment before preparation of the liquid organic dispersion, or during preparation of the liquid organic dispersion. In the above-mentioned method (1), the liquid dispersion may be obtained, for example, by preparing the organic solvent solution of the anionic resin, neutralizing the acid group of the anionic resin (neutralizing step), and then mixing thus resulting organic solvent solution of the resin and the coloring agent. Moreover, after polymerizing the anionic resin by a solution polymerization, if necessary, the organic solvent may be added to the obtained resin-containing polymer solution (or resin solution) to give an organic solvent solution, and the organic solvent solution may be utilized for preparing the liquid organic dispersion. In this case, the solid concentration of the resin-containing polymer solution may for example be about 5 to 50% by weight (e.g., about 10 to 40% by weight).

The alkanolamine used for neutralization includes, for example, a compound represented by the above-mentioned formula (1). In the formula (1), examples of the hydrocarbon group represented by $R^1$ and $R^2$ may include an alkyl group (e.g., a $C_{1-6}$ linear or branched alkyl group such as methyl group or ethyl group), a cycloalkyl group (e.g., a $C_{5-8}$cycloalkyl group such as cyclohexyl group), an aryl group (e.g., a $C_{6-10}$aryl group such as phenyl group), and an aralkyl group (e.g., a $C_{6-10}$aryl-$C_{1-4}$alkyl group such as benzyl group). The groups $R^1$ and $R^2$ may be a hydrocarbon group (a hydrocarbon group as mentioned above) having a hydroxyl group as a substituent, respectively, and such a group includes, for example, a hydroxyalkyl group, a hydroxyaryl group, and others. The number of the hydroxyl group is not particularly limited to a specific one, and may be, for example, about 1 to 3. Examples of a nitrogen-containing ring formed from $R^1$ and $R^2$ bonding to each other and the adjacent nitrogen atom may include a saturated or unsaturated nitrogen-containing ring, for example, a 5 to 8-membered nitrogen-containing ring such as pyrrolidine, pyrroline, piperidine, or piperazine. Among these $R^1$ and $R^2$, an alkyl group, in particular a $C_{1-4}$alkyl group is preferred.

The linear or branched alkylene group represented by $R^3$ may include, for example, a linear $C_{1-6}$alkylene group such as methylene group, ethylene group, trimethylene group or 1,4-butylene group; and a branched $C_{2-6}$alkylene group such as propylene group, 2-methyl-n-propylene group, 2,2-dimethyl-n-propylene group or 1,3-butylene group (e.g., a linear $C_{2-4}$alkylene group having a $C_{1-2}$alkyl group as a substituent). Among these $R^3$, in particular, a branched alkylene group, particularly a branched alkylene group represented by the following formula (1a) is preferred.

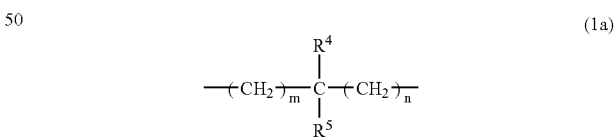

(1a)

In the formula, $R^4$ and $R^5$ are the same or different and each represents a hydrogen atom or a $C_{1-2}$alkyl group, and at least one of $R^4$ and $R^5$ is a $C_{1-2}$alkyl group; "m" and "n" are the same or different and each denotes an integer of 0 to 3; and the total of "m" and "n" is integer of 1 to 3.

In the formula (1a), both of $R^4$ and $R^5$ are preferably a $C_{1-2}$alkyl group, respectively. The numbers "m" and "n" may be preferably an integer of 0 to 2, and more preferably an integer of 0 or 1, respectively.

Specific examples of the alkanolamine include a linear alkanolamine (for example, a linear $C_{1-6}$alkanolamine, e.g., a primary amine such as ethanolamine; a secondary amine such as diethanolamine or methylethanolamine; and a tertiary amine such as 3-dimethylaminoethanol, 3-dimethylamino-1-propanol, 4-dimethylamino-1-butanol or 6-dimethylamino-1-hexanol), and a branched alkanolamine (for example, a branched $C_{2-6}$alkanolamine, e.g., a primary amine such as 2-methyl-1-propanolamine; a secondary amine such as (2-hydroxypropyl)methylamine; and a tertiary amine such as 3-dimethylamino-2,2-dimethyl-1-propanol, or 2-dimethylamino-2-methyl-1-propanol). Among them, a tertiary amine (for example, a $diC_{1-4}$alkylhydroxy branched $C_{2-6}$alkylamine) is preferred.

The alkanolamine may be used singly or in combination. Moreover, the alkanolamine may be used in combination with other base [for example, an inorganic base (e.g., ammonia, and an alkali metal hydroxide such as sodium hydroxide or potassium hydroxide), and an organic base (e.g., an alkylamine compound such as trimethylamine, triethylamine, tributylamine or trioctylamine, a heterocyclic amine compound such as morpholine)] as far as the formation of microcapsule is not inhibited.

The neutralization degree for the acid group of the resin may be selected from a range that the resin can convert to at least water dispersible one and form a capsule particle by dispersion (phase inversion emulsification or emulsification/dispersion), for example, a wide range from about 10 to 100 mol % (in particular about 10 to 75 mol %). The neutralization degree may be usually about 10 to 60 mol %, and preferably about 10 to 50 mol % (e.g., about 10 to 40 mol %). The resin may be water-soluble by a neutralization treatment. The particle size of the capsule particle may be controlled or the distribution range in the particle size may further controlled, by adjusting the amount of the acid group introduced into the resin and/or the neutralization degree of the acid group of the resin.

Along with preparing the organic solvent solution, the colored particle (or coloring agent) may be used in the form of a liquid dispersion in which the colored particle is pre-dispersed with an appropriate dispersing agent (e.g., a low or high molecular weight dispersing agent, a surfactant). For example, the anionic resin whose acid group may be neutralized and the coloring agent may be subjected to dispersing treatment in the presence of a hydrophobic organic solvent (e.g., the reaction solvent in the polymerization) to give a liquid dispersion of the coloring agent, and the colored particle may be used in the form of the obtained liquid dispersion. The amount of the coloring agent may for example be about 1 to 100 parts by weight, preferably about 5 to 75 parts by weight, and more preferably about 5 to 50 parts by weight, relative to 100 parts by weight of the resin in terms of solid contents.

Moreover, the dispersing treatment of the colored particle (coloring agent) may be conducted by utilizing various means for dispersion, for example, a dispersion apparatus such as an ultrasonication apparatus or a ball mill, as far as the colored particle is dispersible in the hydrophobic disperse medium (oil phase).

More specifically, the step for preparing the liquid organic dispersion may for example be conducted as follows. A resin solution is obtained by preparing a liquid organic solvent containing a resin (for example, a copolymer comprising a styrene-(meth)acrylate-(meth)acrylic acid-series copolymer and others, and a copolymer having a number average molecular weight of about $5\times10^3$ to $5\times10^4$) having an appropriate acid value based on carboxyl group (e.g., an acid value of 20 to 400 mgKOH/g), and a crosslinkable group, and neutralizing the acid group of the resin with a base (an alkanolamine) to suitable neutralization degree (e.g., a neutralization degree of about 10 to 40 mol %). On the other hand, a liquid dispersion containing a coloring agent or colorant (organic pigment or inorganic pigment) is prepared by subjecting the coloring agent to a dispersing treatment together with the resin (a resin which may be subjected to neutralization treatment) in the presence of a hydrophobic solvent. Then, the resin solution and the liquid dispersion containing the coloring agent may be mixed together to give a liquid organic dispersion containing the dispersed coloring agent.

(Production of Capsule Particle)

In the formation step of the capsule particle, a capsule particle having a core material encapsulated (or enclosed) in the anionic resin is formed from a water dispersion in which the liquid organic dispersion containing the colored particle dispersed in the oil phase (coloring agent dispersed in oil phase) is dispersed in an aqueous medium (particularly water).

The dispersion of the liquid organic dispersion in the water medium is not particularly limited to a specific one as far as the dispersed phase of the liquid organic dispersion (O-phase) can be formed in the continuous phase of the aqueous medium (W-phase). For example, the dispersion may be carried out by adding the liquid organic dispersion to the aqueous medium for emulsification/dispersion, or may be carried out by adding the aqueous medium to the liquid organic dispersion for phase inversion emulsification.

The dispersion may be usually conducted with acting a shearing force on the mixed system comprising the liquid organic dispersion and the aqueous medium (particularly water). The shearing force may be a shearing force such as agitation, or a shearing force due to vibration such as ultrasonic waves. The dispersion is often carried out under agitation.

Incidentally, in the phase inversion emulsification, when an aqueous medium for an aqueous medium phase (W-phase) is added to an organic continuous phase (O-phase) containing a resin whose acid group has been neutralized and an organic solvent, the continuous phase is changed or transformed from the organic continuous phase (O-phase) to the water continuous phase or water medium phase (W-phase) with emulsifying the organic phase to a discontinuous phase (that is, phase inversion emulsification). Thus, the resin is localized around the organic phase to form a water dispersion in which the capsule particle enclosing the organic phase is stably dispersed in the water medium. More specifically, capsule particles can be produced by mixing a resin solution containing a resin having a neutralized acid group with a liquid dispersion of a coloring agent, and adding water to the obtained mixture under agitation to bring (or induce) the mixture to a phase inversion emulsification. In agitation, an appropriate shearing force for mixing the aqueous medium phase and the organic phase uniformly may be acted on the mixture, and a water dispersion containing a capsule particle can be obtained without taking particular means.

In such an aqueous dispersion, the proportion of the liquid organic dispersion relative to the aqueous medium is not particularly limited to a specific one as far as the dispersed phase of the liquid organic dispersion can be formed, and the proportion [the liquid organic dispersion/the aqueous medium] (weight ratio) may be, for example, about 10/90 to 50/50, preferably about 20/80 to 50/50, and more preferably about 25/75 to 50/50.

The dispersing treatment may be conducted at an appropriate temperature (for example, about 5 to 40° C., preferably about 15 to 30° C., and particularly a room temperature), and if necessary by or under cooling or heating. Moreover, in the phase inversion emulsification, as the temperature difference between the liquid oil-based dispersion containing the coloring agent (or liquid organic dispersion) and the aqueous medium is small, it is more preferred. The temperature difference between the both may for example be usually about 0 to 15° C. (preferably about 0 to 10° C., and particularly about 0 to 5° C.). Incidentally, if the shearing force due to agitation is too small in dispersing treatment, a capsule particle having a broad particle size distribution is liable to be formed. Meanwhile, if the shearing force is excessively large, the formed capsule particle is broken and an aggregate or highly fine particle is formed, and there is a possibility that the particle size distribution becomes larger.

The emulsified mixture formed by the emulsification/dispersion or phase inversion emulsification comprises a microcapsule particle enclosing a disperse system, and a disperse medium (solvent phase) in which the microcapsule is dispersed, wherein the solvent phase comprises water and an organic solvent (organic solvent other than a hydrophobic dispersion medium for a coloring agent which is enclosed in the capsule particle and constitutes a disperse system). Therefore, the emulsified mixture formed by the dispersing treatment (e.g., emulsification/dispersion, and phase inversion emulsification) may be usually subjected to an organic solvent-removing treatment to form a liquid aqueous dispersion having a microcapsule particle dispersed in an aqueous medium. The organic solvent may be removed by a conventional method, for example, distillation, particularly distillation under reduced pressure. As described above, the organic solvent preferably has a low-boiling point in view of distillation. Moreover, for adjusting the concentration of the dispersion, to the obtained liquid aqueous dispersion may be optionally added or supplemented an aqueous medium.

(Crosslinking or Curing of Wall)

The crosslinking or curing of the capsule particle may be conducted by crosslinking or curing the resin constituting the wall by self-crosslinking or with a crosslinking agent. The crosslinking or curing of the wall increases the thickness of the wall and enhances the mechanical strength of the capsule particle. Moreover, the anionic resin constituting the wall is preferably crosslinked or cured in view of barrier property to the oil phase. Incidentally, the crosslinking agent usually has a plurality of reactive groups in one molecule.

The crosslinking agent may be selected depending on the species of the crosslinkable functional group of the resin, and for example, the following combinations may be used.

(1) When the crosslinkable functional group is a carboxyl group, examples of the crosslinking agent include an aminoplast resin (for example, a resin having a methylol group or an alkoxymethyl group such as a urea resin, a guanamine resin, or a melamine resin), a glycidyl group-containing compound (or polyepoxy compound or epoxy resin), a carbodiimide group-containing compound (a polycarbodiimide compound), an oxazoline group-containing compound [for example, a polyoxazoline compound such as a polymer having an oxazoline group (e.g., an acrylic polymer, and acryl-styrenic copolymer)], a metal chelate compound, and others.

(2) When the crosslinkable functional group is a hydroxyl group, the crosslinking agent includes, for example, an aminoplast resin, a polyisocyanate compound which may be blocked, an alkoxysilane compound, and others.

(3) When the crosslinkable functional group is a glycidyl group, examples of the crosslinking agent include a carboxyl group-containing compound (a polycarboxylic acid or an acid anhydride thereof), a polyamine compound, a polyaminoamide compound, a polymercapto compound, and others.

Among the crosslinking agents, the polyepoxy compound (also including an epoxy resin) includes a glycidyl ether-based epoxy compound, a glycidyl ester-based epoxy compound, a glycidyl amine-based epoxy compound, in addition, a cyclic aliphatic epoxy resin (e.g., an alicyclic diepoxy acetal, an alicyclic diepoxyadipate, an alicyclic diepoxycarboxylate, and a vinylcyclohexane dioxide), a heterocyclic epoxy resin (e.g., triglycidyl isocyanurate (TGIC), and a hydantoin-based epoxy resin), and others.

Examples of the glycidyl ether-based epoxy compound include a glycidyl ether compound obtained by a reaction of a polyhydroxy compound (e.g., a bisphenol compound, a polyhydric phenol compound, an alicyclic polyhydric alcohol compound, and an aliphatic polyhydric alcohol compound) and epichlorohydrin, a novolak epoxy resin, and others. The glycidyl ether-based epoxy compound includes, depending on the species of the polyhydroxy compound, for example, a glycidyl ether of a bisphenol compound [for example, a diglycidyl ether of a bisphenol compound (e.g., a bis(hydroxyphenyl)alkane such as 4,4'-dihydroxybiphenyl, bisphenol A, bisphenol F, or bisphenol AD), such as a bisphenol-based epoxy resin such as a bisphenol A diglycidyl ether (a bisphenol A-based epoxy resin), a bisphenol F-based epoxy resin, or a bisphenol AD-based epoxy resin; a diglycidyl ether of a $C_{2-3}$alkylene oxide adduct to a bisphenol compound], a glycidyl ether of a polyhydric phenol compound (e.g., a diglycidyl ether of resorcin, or hydroquinone), a glycidyl ether of an alicyclic polyhydric alcohol compound (e.g., diglycidyl ether of cyclohexanediol, cyclohexanedimethanol, or hydrogenerated bisphenol compound), a glycidyl ether of an aliphatic polyhydric alcohol compound (e.g., a diglycidyl ether of an alkylene glycol such as ethylene glycol, or propylene glycol; a polyoxy$C_{2-4}$alkylene glycol diglycidyl ether such as a polyethylene glycol diglycidyl ether), a novolak epoxy resin (e.g., a phenol-novolak or cresol-novolak epoxy resin), and others. The bisphenol A-based epoxy compound is, for example, available from Japan Epoxy Resins Co., Ltd. as "Epikote (registered trademark) 828". Moreover, trade name "EPICLON 850" (manufactured by Dainippon Ink And Chemicals, Inc.) as bifunctional glycidyl ether, and trade name "TECHMORE (registered trademark)" (manufactured by Mitsui Chemicals, Inc.) as a trifunctional glycidyl ether are also commercially available.

The glycidyl ester-based epoxy compound includes a polycarboxylic acid polyglycidyl ester, for example, a diglycidyl ester of an aromatic dicarboxylic acid such as phthalic acid, isophthalic acid, terephthalic acid, or dimethylphthalic acid; a diglycidyl ester of an alicyclic dicarboxylic acid such as tetrahydrophthalic acid, hexahydrophthalic acid, or dimethylhexahydrophthalic acid; a diglycidyl ester of a dimer acid, or a modified product thereof; and others.

Examples of the glycidyl amine-based epoxy compound include a reaction product of an amine compound and epichlorohydrin, e.g., an N-glycidyl aromatic amine [e.g., tetraglycidyl diaminodiphenylmethane (TGDDM), triglycidyl aminophenol (such as TGPAP or TGMAP), diglycidyl aniline (DGA), diglycidyl toluidine (DGT), tetraglycidyl xylylenediamine (e.g., TGMXA)], an N-glycidyl alicyclic amine (e.g., tetraglycidyl bisaminocyclohexane), m-bis(N,N-diglycidyl aminomethyl)cyclohexane, and others. Incidentally, for example, TGMXA is commercially available as "TETRAD (registered trademark)-X" from Mitsubishi Gas Chemical Company, Inc., and m-bis(N,N-diglycidyl aminomethyl)cyclohexane as "TETRAD (registered trademark)-C" from Mitsubishi Gas Chemical Company, Inc.

Among the crosslinking agents, the carbodiimide group-containing compound includes, for example, a dialkylcarbodiimide (e.g., a $diC_{1-10}$alkylcarbodiimide such as diethylcarbodiimide, dipropylcarbodiimide, or dihexylcarbodiimide); a dicycloalkylcarbodiimide (e.g., a $diC_{3-10}$cycloalkylcarbodiimide such as dicyclohexylcarbodiimide); an arylcarbodiimide (e.g., di-p-tolylcarbodiimide, an arylpolycarbodiimide such as triisopropylbenzenepolycarbodiimide); and others. These carbodiimides may be used singly or in combination.

As the polyisocyanate compound, there may be mentioned a diisocyanate compound [e.g., an aliphatic diisocyanate such as hexamethylene diisocyanate (HMDI) or 2,2,4-trimethylhexamethylene diisocyanate; an alicyclic diisocyanate such as isophorone diisocyanate (IPDI); an aromatic diisocyanate such as tolylene diisocyanate (TDI), or diphenylmethane-4,4'-diisocyanate (MDI); an araliphatic diisocyanate such as xylylene diisocyanate], a triisocyanate compound (e.g., an aliphatic triisocyanate such as lysine ester triisocyanate, or 1,3,6-triisocyanatohexane; an alicyclic triisocyanate such as 1,3,5-triisocyanatocyclohexane; an aromatic triisocyanate such as triphenylmethane-4,4',4"-triisocyanate), and a tetraisocyanate compound (4,4'-diphenylmethane-2,2',5,5'-tetraisocyanate). The polyisocyanate compound may be a block isocyanate which is blocked or masked with phenol, alcohol, caprolactam or others.

The polycarboxylic acid includes a dicarboxylic acid (e.g., an aliphatic dicarboxylic acid such as adipic acid; an alicyclic dicarboxylic acid such as hexahydrophthalic acid; an aromatic dicarboxylic acid such as phthalic acid or terephthalic acid), a tricarboxylic acid such as trimellitic acid, a tetracarboxylic acid such as pyromellitic acid, or others. The acid anhydride of the polycarboxylic acid also includes an anhydride of the above-mentioned polycarboxylic acid, dodecenylsuccinic acid anhydride, methyltetrahydrophthalic acid anhydride, phthalic acid anhydride, HET acid anhydride, or others.

Examples of the polyamine compound includes a hydrazine compound (e.g., hydrazine, a dihydrazide of an organic acid), an aliphatic polyamine (e.g., a $C_{2-10}$alkylene diamine such as ethylene diamine, propylene diamine, trimethylene diamine, or hexamethylene diamine; diethylene triamine, triethylene tetramine, tetraethylene pentamine, and pentaethylene hexamine), an alicyclic polyamine (e.g., diaminocyclohexane, menthene diamine, isophorone diamine, di(aminomethyl)cyclohexane, bis (4-aminocyclohexyl) methane, and bis(4-amino-3-methylcyclohexyl)methane), an aromatic polyamine [e.g., a $C_{6-10}$arylene diamine such as phenylene diamine or diaminotoluene; xylylene diamine, di(2-amino-2-propyl)benzene; 4,4'-biphenylene diamine, biphenylenebis(4-aminophenyl)methane, bis-(4-amino-3-chlorophenyl)methane], or others.

The polyoxazoline compound includes an acryl-styrenic copolymer having an oxazoline group [for example, "EPOCROS (registered trademark) K series" manufactured by Nippon Shokubai Co., Ltd.], an acrylic polymer having an oxazoline group [for example, "EPOCROS (registered trademark) WS series" manufactured by Nippon Shokubai Co., Ltd.], "NK Linker NX" manufactured by Shin-nakamura Chemical Corporation, and others.

The crosslinking agents may be used singly or in combination. Among combinations of the crosslinkable functional group and the crosslinking agent, the preferred combination includes (a) a combination of a carboxyl group which can impart hydrophilicity to the resin by neutralization and also acts as a crosslinkable functional group, and a carbodiimide group-containing compound (polycarbodiimide compound); (b) a combination of a carboxyl group and a polyepoxy compound or an epoxy resin; (c) a combination of carboxyl group and an oxazoline compound; and (d) a combination of a hydroxyl group and a polyisocyanate compound; and other combinations.

The crosslinking agent is preferably a compound dissolved in either the oil phase or the aqueous phase, and is also preferably a crosslinking agent having an imparted hydrophilicity (a hydrophilic or water-soluble crosslinking agent). For example, the carbodiimide compound having an imparted hydrophilicity is available as a hydrophilic carbodilite ("V-02", "V-02-L2", and "V-04", each manufactured by Nisshinbo Industries, Inc.), and others. Moreover, as a carbodiimide compound having lipophilicity, alipophilic carbodilite ("V-05" and "V-07", each manufactured by Nisshinbo Industries, Inc.), or others is commercially available.

The proportion of the resin having the crosslinkable functional group relative to the crosslinking agent is not particularly limited to a specific ratio, and the ratio of the reactive group of the crosslinking agent (such as a carbodiimide group and epoxy group) relative to 1 equivalent of the crosslinkable functional group (such as a carboxyl group) may be selected from about 0.1 to 2 equivalent, usually about 0.1 to 1 equivalent (e.g., about 0.1 to 0.8 equivalent), preferably about 0.2 to 0.7 equivalent, and more preferably about 0.3 to 0.7 equivalent. Incidentally, if necessary, the combination use of a plurality of crosslinking agents is also effective.

The crosslinking agent may be contained in at least one phase of an oil phase (liquid organic dispersion) and a water phase (aqueous medium), and the timing of addition is not particularly limited to a specific time. For example, the crosslinking agent maybe added to an oil-based mixture (liquid organic dispersion) obtained in the step for preparing the liquid organic dispersion, or may be added to an organic solvent in advance of the preparation of the liquid organic dispersion. Moreover, the crosslinking agent may be added to an emulsified dispersion (liquid aqueous dispersion) obtained in the emulsification/dispersion or phase inversion emulsification, or to a liquid aqueous dispersion in which the organic solvent has been eliminated from the aqueous medium of the emulsified dispersion. In the case of using the hydrophobic or oil-soluble crosslinking agent, it is usually advantageous that the crosslinking agent is added to an organic phase (e.g., in the step for preparing the liquid organic dispersion, or to the obtained liquid organic dispersion). When the hydrophilic or water-soluble crosslinking agent is used, it is advantageous that the crosslinking agent is added to a water phase [e.g., to the liquid aqueous dispersion obtained by the emulsification/dispersion or phase inversion emulsification (in particular a liquid aqueous dispersion formed by eliminating the organic solvent from the solvent phase)]. In the preferred embodiment, after forming the liquid aqueous dispersion containing the capsule particle, the crosslinking agent (hydrophilic or water-soluble crosslinking agent) may be added to crosslink or cure the wall resin of the capsule particle in an aqueous medium. If necessary, a hydrophobic or oil-soluble crosslinking agent and a hydrophilic or water-soluble crosslinking agent may be added in a suitable step to react the crosslinkable functional group of the resin component with the crosslinking agent. Further, if necessary, in order to accelerate the crosslinking reaction, the crosslinking agent may be used in combination with catalyst(s) (e.g., an acid catalyst, and a basic catalyst).

The crosslinking or curing of the resin may be conducted at a suitable temperature, and may be usually conducted by heating with stirring. Incidentally, the crosslinking or curing is often carried out in the presence of an aqueous solvent or a hydrophobic solvent. Therefore, the crosslinking or curing is usually carried out, with stirring the liquid dispersion, at a temperature not higher than a boiling point of the solvent (preferably an aqueous medium, particularly water), for example, at a temperature of about 50 to 100° C., preferably about 50 to 90° C., and more preferably about 50 to 80° C. In order to inhibit adhesion or agglomeration of the microcapsule particles, the crosslinking or curing may be carried out at a temperature below the glass transition temperature of the wall (or resin). Incidentally, the crosslinking or curing reaction may for example be completed in about 10 minutes to 12 hours (e.g., about 1 to 5 hours).

(Crosslinking or Curing of Residual Crosslinking Agent)

In the present invention, after the resin constituting the wall is crosslinked or cured with a crosslinking agent, the residual crosslinking agent may be further crosslinked or cured with a polyfunctional compound to increase the crosslinking degree of the wall. The crosslinking or curing with the polyfunctional compound ensures to further increase the thickness of the wall and to further enhance the mechanical strength of the microcapsule.

Such a polyfunctional compound has a plurality of functional groups crosslinkable or curable with a crosslinkable group of the crosslinking agent, and preferably has relatively low molecular weight.

The polyfunctional compound may be selected depending on the crosslinkable group of the crosslinking agent, and includes, for example, the following compounds:

(1) in the case where the crosslinkable group is a glycidyl group (epoxy group); a polycarboxylic acid or an anhydride thereof, and/or a polyamine compound,
(2) in the case where the crosslinkable group is a methylol group or an alkoxymethyl group; a polycarboxylic acid or an anhydride thereof, and/or a polyhydroxy compound,
(3) in the case where the crosslinkable group is a carbodiimide group, an oxazoline group, or a metal chelate; a polycarboxylic acid or an anhydride thereof,
(4) in the case where the crosslinkable group is a silyl group or an alkoxysilyl group; a polyhydroxy compound,
(5) in the case where the crosslinkable group is an isocyanate group; a polyhydroxy compound, and/or a polyamine compound,
(6) in the case where the crosslinkable group is a carboxyl group; a polyhydroxy compound, a polyepoxy compound, and/or a polyamine compound,
(7) in the case where the crosslinkable group is an amino group; a polycarboxylic acid or an anhydride thereof, a polyepoxy compound, and/or a polyisocyanate compound, and
(8) in the case where the crosslinkable group is a mercapto group; a polyepoxy compound.

Among the polyfunctional compounds, examples of the polyhydroxy compound include a diol compound [e.g., an aliphatic diol such as an alkylene glycol (e.g., ethylene glycol), or a polyoxyalkylene glycol (e.g., diethylene glycol); an alicyclic diol such as 1,4-cyclohexanediol, 1,4-cyclohexanedimethanol, or a hydrogenated bisphenol A; and an aromatic diol such as hydroquinone, resorcinol, biphenol, 2,2-bis(4-hydroxyphenyl)propane, 2,2-bis(4-(2-hydroxyethoxy)phenyl)propane, or xylylene glycol], a triol compound (e.g., glycerin, trimethylolpropane, trimethylolethane), a tetraol compound (e.g., pentaerythritol), or others.

As the polyepoxy compound, there may be mentioned a compound having relatively lower molecular weight among the above-mentioned epoxy compounds, for example, a glycidyl ether of a polyhydroxy compound such as a polyhydric phenol compound, an alicyclic polyhydric alcohol compound, or an aliphatic polyhydric alcohol compound; a polyglycidyl ester of a polycarboxylic acid; an N-glycidyl aromatic amine; an N-glycidyl alicyclic amine; and others. The polycarboxylic acid, the polyisocyanate compound, and the polyamine compound include a compound exemplified in the paragraph of the crosslinking agent.

These polyfunctional compounds may be used singly or in combination.

The proportion of the polyfunctional compound relative to the crosslinkable group of the residual crosslinking agent is not particularly limited to a specific one. For example, the proportion may be selected from about 0.1 to 2 equivalent of the functional group of the polyfunctional compound (e.g., an amino group of a polyamine compound) relative to 1 equivalent of the crosslinkable group (e.g., glycidyl group), and may be usually selected from about 0.1 to 1 equivalent (e.g., about 0.1 to 0.8 equivalent), preferably about 0.2 to 0.7 equivalent, and more preferably about 0.3 to 0.7 equivalent of the functional group of the polyfunctional compound relative to 1 equivalent of the crosslinkable group (e.g., glycidyl group).

The timing of addition of the polyfunctional compound is not particularly limited to a specific one, and the polyfunctional compound is preferably added after crosslinking or curing the wall of the capsule particle with the crosslinking agent.

Moreover, the crosslinking or curing reaction with the polyfunctional compound may be conducted at any side of the outer side of the wall (water phase side) or the inner side thereof (oil phase side), or may be conducted at the interface between the oil phase and the water phase. In the case where the crosslinking agent is contained in the oil phase of the capsule particle, a water-soluble polyfunctional compound permeates through the wall and ensures crosslinking inside of the wall.

(Separation and Drying of Capsule Particle)

The capsule particle may be separated from the aqueous medium through a conventional method (such as filtration or centrifugation) to make a wet cake of the capsule particles, and if necessary, dried through a conventional method (such as spray drying or lyophilization). Moreover, the capsule particle may be separated by drying the liquid aqueous dispersion containing the capsule particle through a conventional drying method (such as spray drying or lyophilization). The powdery microcapsule (capsule type display element or ink) enclosing the disperse system (oil disperse system or core material) may be obtained by drying the capsule particle.

Incidentally, the capsule particle may be subjected to hydrolyzing treatment with an acid to liberate the neutralized acid group of the resin. As the acid, any of an organic acid and an inorganic acid may be used as long as the acid liberates the acid group. As the acid, there may be used, for example, an organic acid such as an organic carboxylic acid (e.g., formic acid, acetic acid, trichloroacetic acid, trifluoroacetic acid), and an organic sulfonic acid (e.g., methanesulfonic acid, benzenesulfonic acid, p-toluenesulfonic acid); a mineral acid or inorganic acid such as hydrochloric acid and phosphoric acid. The acid may be usually used in the form of an acidic aqueous solution.

The hydrolyzing treatment may be carried out in any step of before separating or drying the capsule particle and after drying the capsule particle. For example, the hydrolyzing treatment may be directed to a capsule particle separated from an aqueous medium or a dried capsule particle, and if necessary, directed to such a particle in the form of liquid dispersion by adding water, or may be conducted by adding an acid to a liquid aqueous dispersion containing a capsule particle, optionally under heating.

In the present invention, since the acid group of the anionic resin forming the capsule wall is neutralized with an alkanolamine in a production of the capsule particle through emulsification/dispersion or phase inversion emulsification, the hydrophilicity of the neutralized anionic resin can be increased due to the hydroxyl group of the alkanolamine, and thereby the capsule particle in the dispersed form (emulsion particle) can be stabilized. Moreover, use of the alkanolamine having a bulky group (e.g., a bulky branched alkyl group), by the steric repulsion effect due to the bulky group, can effectively prevent emulsions from aggregation (including gelation), and can further stabilize the capsule particle (emulsion particle). Thus, the present invention ensures to inhibit precipitation or gelation of the resin associated with emulsification/dispersion or phase inversion emulsification, and additionally, to effectively inhibit breakdown of the wall associated with collision of the capsule particles due to agitation or with drying the capsule particle.

According to the present invention, a resin having an acid group neutralized with an alkanolamine as a resin constituting a wall of a microcapsule can make the particle size of the microcapsule smaller and uniform in spite of encapsulating a disperse system containing a colored particle dispersed in an oil phase. Moreover, in the case where a resin constituting a wall of a capsule particle is crosslinked or cured with a crosslinking agent or the residual crosslinking agent is further crosslinked or cured with a polyfunctional compound, the thickness of the microcapsule wall can be increased and mechanical strength of the microcapsule can be improved, and additionally stability and durability of the microcapsule can be improved. In the case where an electrophoretically movable colored particle is contained in an oil phase, a sharp and uniform image can be displayed without depending on a disperse state of a core material by applying the microcapsule to electrophoretically imagedisplayable apparatuses (or devices). The production process of the present invention ensures to certainly produce a microcapsule having a controlled particle size with a simple manner and high efficacy by inhibiting the gelation and formation of a non-encapsulated particle without using an emulsifying or dispersing agent.

The microcapsules of the present invention are useful for an image display device (or element) for forming an image by utilizing an electrophoresis of a colored particle in response to applying a voltage between electrodes.

EXAMPLES

The following examples are intended to describe this invention in further detail and should by no means be interpreted as defining the scope of the invention. Incidentally, unless otherwise noted, "part(s)" indicates "part(s) by weight" in the following examples and comparative examples.

The following characteristics were evaluated about microcapsules.

[Electrophoretic Property]

One electrode was overspread with a dried microcapsule particle (encapsulating titanium oxide and oil blue), and further covered with a transparent electrode to form a plate. A voltage was applied between the both electrodes, and the state that the color of the plate was changed from white to blue or from blue to white, in response to switching the polarity of the electrode from positive charge to negative charge or from negative charge to positive charge, was observed. This color change is attributable to migration of either particle to the plate surface side (transparent electrode side) in electrophoresis phenomenon because oil blue and titanium oxide were charged negative and positive, respectively.

[Particle Size Distribution]

In each of Examples and Comparative Examples, one droplet of a liquid aqueous dispersion containing a microcapsule (liquid aqueous dispersion before filtrating out a capsule particle) obtained from each of Examples and Comparative Examples was dropped on a slide glass and covered with a cover glass, and observed by an optical microscope. The observation image data was digitized (or computerized) by a CCD (charge-coupled device) camera system connected to the optical microscope. The digitized image data was analyzed by a computer with the use of an image analysis soft ("WinROOF", manufactured by Mitani Corporation) to determine the particle size distribution. Incidentally, regarding the dried fine particle (capsule particle, and powder containing non-capsule fine particle), the particle size distribution can be determined in the same manner as described above by means of observing by a scanning electron microscope and digitizing the observed image data.

[Glass Transition Temperature]

The dried microcapsule was crushed in a mortar, and the crushed matter was immersed in acetone and stirred to elute the encapsulated colored liquid dispersion. The resulting eluate was centrifuged to discard a supernatant, and another acetone was added to the residual precipitate for washing. This washing operation was repeated further twice, and the finally resultant precipitate was dried at a room temperature in a vacuum oven. The glass transition temperature of the dried product was measured with a dynamical scanning calorimeter ("DSC 6200", manufactured by Seiko Instruments, Inc.).

[State of Liquid Microcapsule Dispersion]

In each of Examples and Comparative Examples, one droplet of a liquid capsule dispersion prepared without addition of titanium oxide nor a pigment-dispersing agent was dropped on a slide glass and covered with a cover glass, and observed by an optical microscope. The state of the capsule particle was evaluated based on the following criteria.

"A": Particles are uniform in size, the wall of each particle is thick, and the strength thereof is high.

"B": The wall of each particle is somewhat thin, the strength of thereof is low, but the particles are uniform in size.

"C": Part of particles has a thick wall and a high strength, but the particles vary widely in size and wall thickness.

"D": capsule-unformed components and capsule particles are mixed, and the formed capsule particles are lack of uniformity in both size and wall thickness.

"E": capsule-unformed components and capsule particles are mixed, and the wall thickness of each capsule particle is very thin and the strength thereof is low.

"F": No capsule particle could be formed due to gelation along with emulsification or precipitation of resin along with heat treatment.

Examples and Comparative Examples

1. Preparation and Neutralization of Anionic Resin

In a reaction vessel, 120 parts of 2-propanol (IPA) was put, and heated to 80° C. To the 2-propanol was then added dropwise a mixture containing the following components in a proportion shown below over about 2 hours under a nitrogen flow, and the reaction was carried out.

| | |
|---|---|
| Methyl methacrylate (MMA) | 60 parts |
| Butyl acrylate (BA) | 15 parts |
| Methacrylic acid (MAA) | 25 parts |
| 2,2'-azobis-2,4'-dimethylvaleronitrile (ADVN) | 1.5 parts |

After 2 hours and 5 hours of completion of the dropwise, a mixture of IPA (11 parts) and ADVN (0.5 part) was added to the reaction mixture in twice, and the resultant mixture was maintained at 80° C. for another 4 hours to give a resin solution containing a solid matter (heating residue or non-volatile content) of 43.0%. The acid value of the resulting anionic resin was 162.9 mgKOH/g.

To the above-mentioned anionic resin (46.5 parts) was added IPA (53.5 parts) at a room temperature, and a neutralizing agent shown in Table 1 was added to the mixture in a proportion described in Table 1 to neutralize the anionic resin (neutralization degree of 35 mol %).

2. Preparation of Colored Liquid Dispersion

Diisopropylnaphthalene, oil blue and a pigment-dispersing agent were mixed in the following proportion under heating with stirring, and dissolved thoroughly at 90° C. The mixture was maintained at 90° C. for 20 minutes, and then cooled to a room temperature. In the resulting mixture (colored solution (oil blue solution dissolved in diisopropylnaphthalene)) was dispersed titanium oxide in the following proportion to prepare a colored liquid dispersion.

| | |
|---|---|
| Diisopropylnaphthalene (manufactured by Kureha Chemical Industry Co., Ltd., "KMC-113") | 50 parts |
| Oil blue | 0.1 part |
| Pigment-dispersing agent (manufactured by Avecia KK, "Solsperse 17000") | 0.5 part |
| Titanium oxide (manufactured by Ishihara Sangyo Kaisha, Ltd., "CR-90") | 5 parts |

To 55.6 parts of the resulting colored liquid dispersion was added 15.7 parts of an epoxy resin (manufactured by Mitsui Chemicals, Inc., "TECHMORE") as a crosslinking agent. The mixture was stirred at a room temperature for 10 minutes to give a colored liquid dispersion containing the epoxy resin.

3. Preparation of Encapsulated Ink

The neutralized anionic resin obtained by the above step 1 (103.1 parts) and the colored liquid dispersion containing the epoxy resin obtained by the above step 2 (71.3 parts) were mixed together at a room temperature, and 150 parts of deionized water was added dropwise to the mixture with stirring for phase inversion emulsification.

The mixture obtained by phase inversion emulsification was subjected to the following post-treatment step to give a powdery microcapsule. That is, a crosslinking reaction between an epoxy group of the epoxy resin and a carboxyl group of the resin constituting the emulsion obtained by phase inversion emulsification was allowed to progress by heat-treating the mixture at 80° C. for 30 minutes. Thereafter, the resulting emulsified mixture was subjected to a distillation under a reduced pressure to remove IPA. To the resulting liquid aqueous dispersion was added 300 parts of deionized water, and the mixture was further heat-treated at 80° C. overnight to complete the crosslinking between the epoxy group of the epoxy resin and the carboxyl group. To the resulting liquid aqueous dispersion of microcapsule was added 6.1 parts of diethylenetriamine, and the epoxy group of the epoxy resin remaining within the capsule was allowed to react with diethylenetriamine at the interface between oil and water to consume the residual epoxy group thoroughly. After the above-mentioned crosslinking treatments, the resulting liquid aqueous dispersion was filtrated, and 300 parts of deionized water was added to the filter cake, and the mixture was adjusted to pH 2 to 3 with acetic acid with stirring, and dried by a spray drier to give a capsule powder.

Incidentally, neutralizing agents used in Examples and Comparative Examples are shown below.

N1: 3-dimethylamino-2,2-dimethyl-1-propanol

N2: 2-dimethylamino-2-methyl-1-propanol

N3: 1-methyl-2-pyrrolidineethanol

N4: 2-dimethylaminoethanol

N5: 3-dimethylamino-1-propanol

N6: 4-dimethylamino-1-butanol

N7: 6-dimethylamino-1-hexanol

N8: trioctylamine

N9: N,N-dimethyl-n-decylamine

The results are shown Table 1. FIGS. 1 to 6 show optical microphotographs of the liquid capsule dispersions of Examples 1 to 6 prepared without adding neither titanium oxide nor a pigment-dispersing agent, respectively.

TABLE 1

| | | Neutralizing agent | Proportion (parts) | Particle size distribution (μM) | Tg (° C.) | Electrophoretic property | State of liquid microcapsule dispersion |
|---|---|---|---|---|---|---|---|
| Ex. 1 | N1 | H₃C\N—CH₂—C(CH₃)(CH₃)—CH₂—OH / H₃C | 3.1 | 32 ± 7 | 198 | A | A |
| Ex. 2 | N2 | H₃C\N—C(CH₃)(CH₃)—CH₂—OH / H₃C | 2.6 | 37 ± 8 | 191 | A | A |
| Ex. 3 | N3 | CH₃-N-pyrrolidine-(CH₂)₂—OH | 2.7 | — | — | — | E |
| Ex. 4 | N4 | H₃C\N—(CH₂)₂—OH / H₃C | 2.0 | 50 ± 10 | 120 | A | B |
| Ex. 5 | N5 | H₃C\N—(CH₂)₃—OH / H₃C | 2.4 | 42 ± 15 | — | — | C |
| Ex. 6 | N6 | H₃C\N—(CH₂)₄—OH / H₃C | 2.7 | — | — | — | D |
| Ex. 7 | N7 | H₃C\N—(CH₂)₆—OH / H₃C | 3.4 | — | — | — | F |
| Com. Ex. 1 | N8 | $(C_8H_{17})_3$—N | 8.9 | — | — | — | F |
| Com. Ex. 2 | N9 | H₃C\N—C₁₀H₂₁ / H₃C | 4.8 | — | — | — | F |

Figure 2:
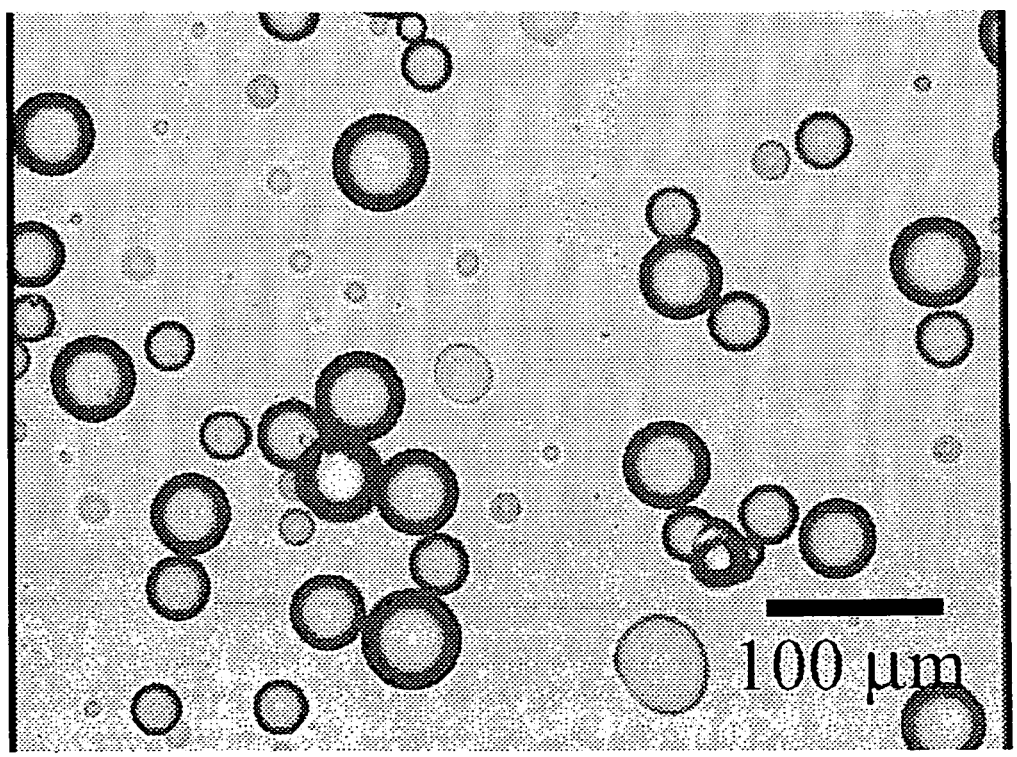
FIG. 2 is an optical microphotograph of the liquid capsule dispersion (without both titanium oxide and a pigment-dispersing agent) obtained in Example 2.
Figure 3:
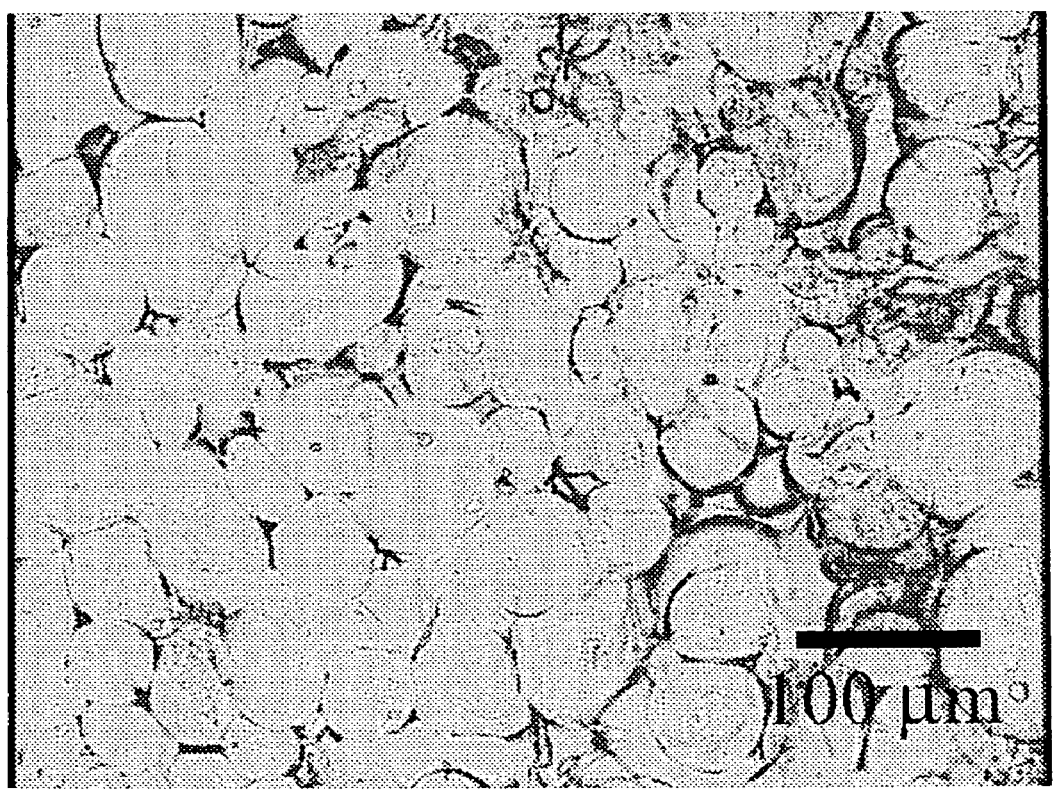
FIG. 3 is an optical microphotograph of the liquid capsule dispersion (without both titanium oxide and a pigment-dispersing agent) obtained in Example 3.
Figure 4:
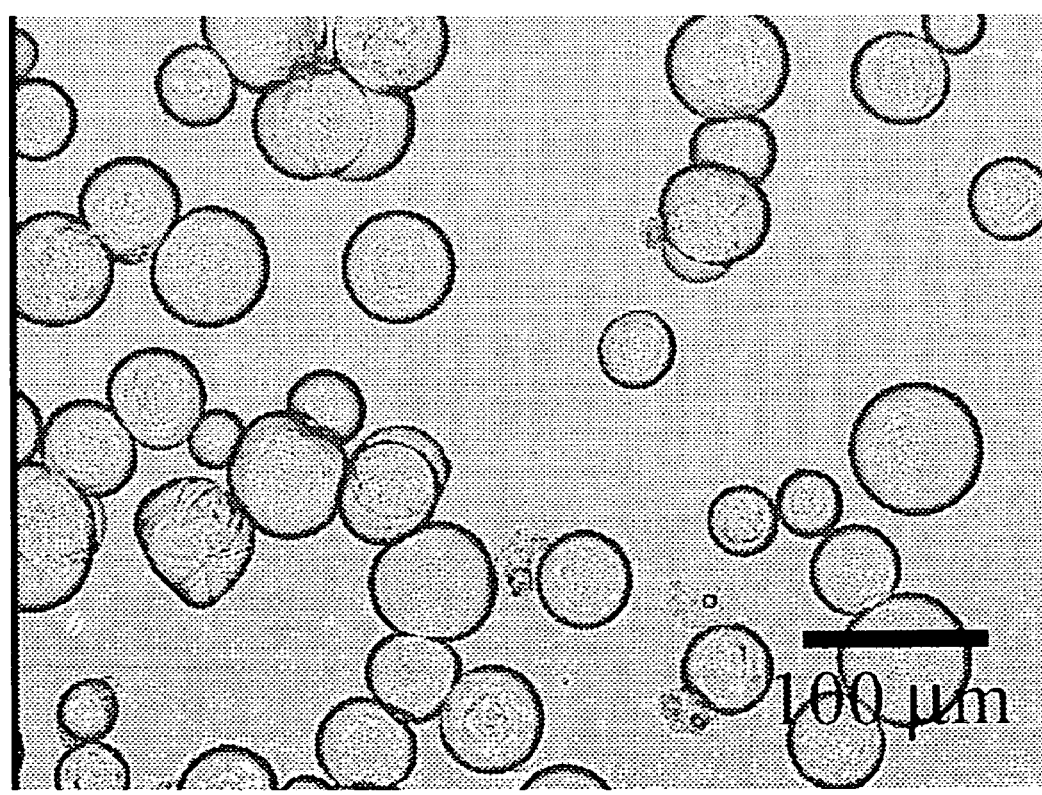
FIG. 4 is an optical microphotograph of the liquid capsule dispersion (without both titanium oxide and a pigment-dispersing agent) obtained in Example 4.
Figure 5:
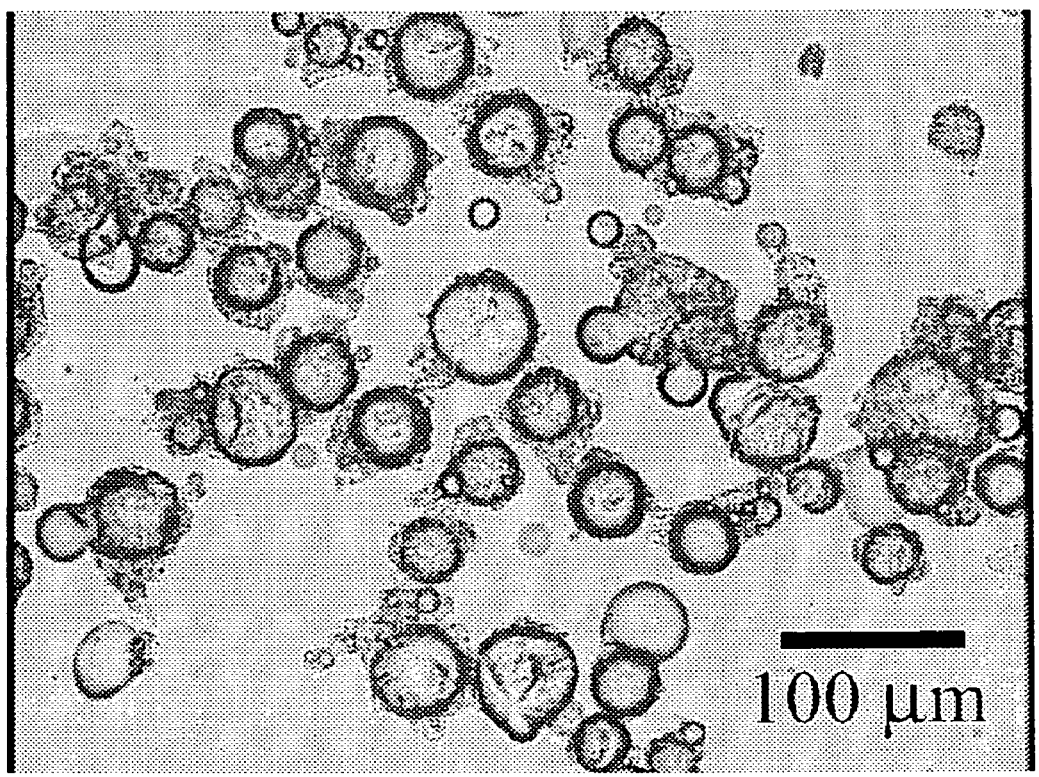
FIG. 5 is an optical microphotograph of the liquid capsule dispersion (without both titanium oxide and a pigment-dispersing agent) obtained in Example 5.
Figure 6:
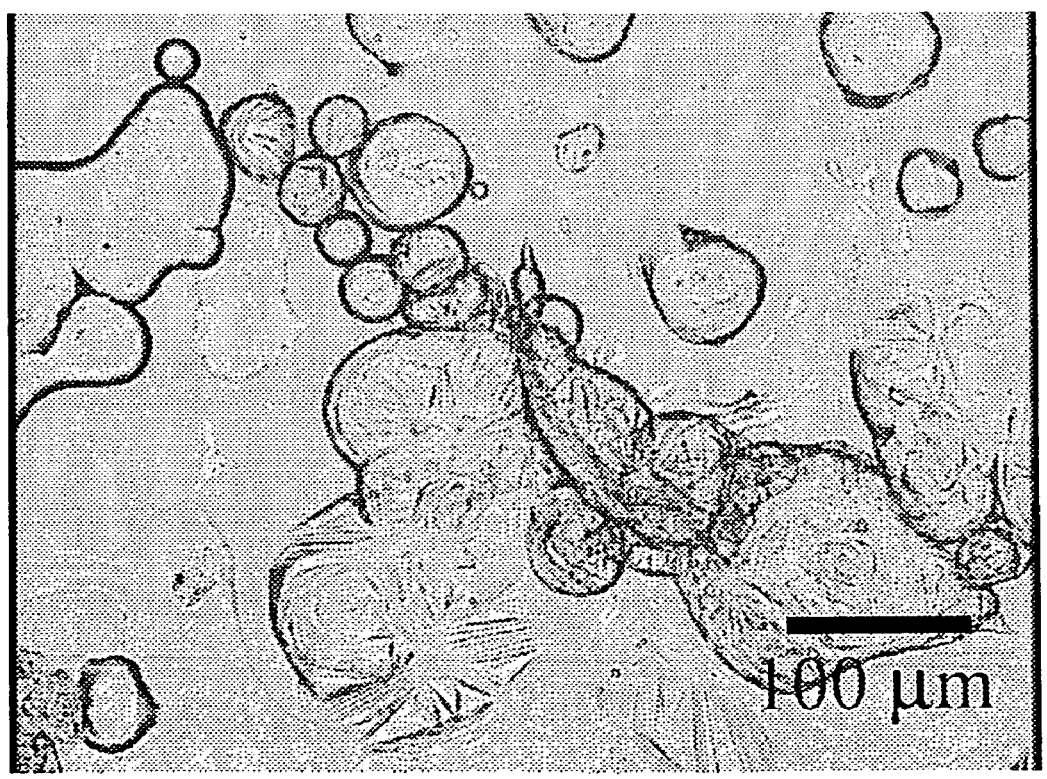
FIG. 6 is an optical microphotograph of the liquid capsule dispersion (without both titanium oxide and a pigment-dispersing agent) obtained in Example 6.

As apparent from Table 1 and Figs., in Examples 1 to 6, microcapsules were formed efficiently (FIGS. 1 to 6). In particular, in Examples 1, 2, 4 and 5, microcapsules having a narrow width in particle size distribution and being uniform in particle size were stably obtained in the dried forms (Table 1). Among them, microcapsules obtained in Example 1, 2 and 4 particularly slightly varied in particle size, and were uniform in the thickness of the wall (in particular, the capsule particles of Examples 1 and 2 were large in the thickness of the wall and stable as a capsule) (FIGS. 1, 2 and 4). Moreover, because of high Tg, it is apparent that the microcapsules of Examples 1, 2 and 4 were strong. Further, these microcapsules were excellent in electrophoretic property (Table 1). On the contrary, in Comparative Examples, the resin was precipitated along with addition of deionized water in phase inversion emulsification, even an emulsion particle could not be formed.

Incidentally, in Examples 3, 5 and 6, microcapsules were formed, however, the thickness of the microcapsule were thin and the capsule tended to break along with drying the microcapsules. Incidentally, in Example 7, gelation occurred during heat-treatment (crosslinking treatment), and the efficiency of the encapsulation was low.

What is claimed is:

1. A process for producing a microcapsule, which comprises dispersing a liquid organic dispersion in an aqueous medium to form a capsule particle in the aqueous medium, the liquid organic dispersion containing an acid group-containing resin having an acid value of 20 to 400 mgKOH/g in the free acid form, a colored particle and an organic solvent, and the capsule particle comprising a disperse system containing the liquid organic dispersion, and a wall encapsulating the disperse system, wherein the acid group of the resin has been at least partly neutralized with an alkanolamine represented by the following formula (1):

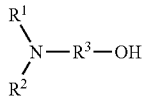

(1)

wherein $R^1$ and $R^2$ are the same or different and each represents a hydrogen atom or a hydrocarbon group which may have a hydroxyl group as a substituent; $R^1$ and $R^2$ may bond to each other to form a nitrogen-containing ring together with the adjacent nitrogen atom; and $R^3$ represents a $C_{2-6}$ branched alkylene group, wherein the disperse system comprises an electrically insulating dielectric fluid, and a single kind or plural kinds of colored particle(s) dispersed in the dielectric fluid and the colored particle is charged in the electrically insulating dielectric fluid and movable electrophoretically in the microcapsule by a potential difference, and the wall comprises the resin;

which the process further comprises crosslinking or curing the resin constituting the wall with the use of the acid group of the resin.

2. A process according to claim 1, wherein in the formula (1), $R^1$ and $R^2$ are an alkyl group which may have a hydroxyl group as a substituent, respectively.

3. A process according to claim 1, wherein in the formula (1), $R^1$ and $R^2$ are a $C_{1-4}$alkyl group, respectively, and $R^3$ is a $C_{2-4}$alkylene group which has a $C_{1-2}$alkyl group as a substituent.

4. A process according to claim 1, wherein in the formula (1), $R^3$ is a branched alkylene group represented by the following formula (1a):

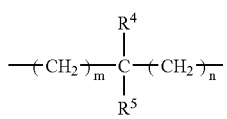

(1a)

wherein $R^4$ and $R^5$ are the same or different and each represents a hydrogen atom or a $C_{1-2}$alkyl group; at least one of $R^4$ and $R^5$ is a $C_{1-2}$alkyl group; "m" and "n" are the same or different and each denotes an integer of 0 to 3; and the total of "m" and "n" is integer of 1 to 3.

5. A process according to claim 1, wherein the acid group of the resin comprises at least one member selected from the group consisting of a carboxyl group, an acid anhydride group, a phosphoric acid group, a sulfonic acid group and a sulfuric acid group.

6. A process according to claim 1, wherein the acid group-containing resin is (i) a copolymer of an acidic polymerizable monomer, and a polymerizable monomer copolymerizable to the acidic polymerizable monomer, or (ii) a copolymer of the acidic polymerizable monomer, the polymerizable monomer copolymerizable to the acidic polymerizable monomer, and a monomer containing a crosslinkable functional group other than an acid group.

7. A process according to claim 1, wherein the resin is crosslinked or cured with a crosslinking agent.

8. A process according to claim 7, wherein a combination of the acid group of the resin and the crosslinking agent is (a) a combination of a carboxyl group and a carbodiimide group-containing compound, (b) a combination of a carboxyl group and a polyepoxy compound or an epoxy resin, or (c) a combination of a carboxyl group and an oxazoline compound.

9. A process according to claim 1, wherein the wall comprises the resin, and which the process comprises crosslinking or curing the resin with a crosslinking agent, and further crosslinking or curing the residual crosslinking agent with a polyfunctional compound.

10. A process according to claim 9, wherein a combination of a crosslinkable group of the crosslinking agent and the polyfunctional compound is (a) a combination of a carbodiimide group or an oxazoline group and a polycarboxylic acid or an anhydride thereof, or (b) a combination of an epoxy group and at least one member selected from the group consisting of a polycarboxylic acid or an anhydride thereof and a polyamine compound.

11. The process according to claim 1, wherein the alkanolamine of formula (1) is 3-dimethylamino-2,2-dimethyl-1-propanol.

* * * * *